(12) United States Patent
Kim

(10) Patent No.: US 7,880,891 B1
(45) Date of Patent: Feb. 1, 2011

(54) TOTAL INTERNAL REFLECTION HOLOGRAPHIC MICROSCOPE

(75) Inventor: Myung K. Kim, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 12/791,093

(22) Filed: Jun. 1, 2010

Related U.S. Application Data

(63) Continuation of application No. 12/053,978, filed on Mar. 24, 2008.

(60) Provisional application No. 60/896,381, filed on Mar. 22, 2007.

(51) Int. Cl.
*G01B 9/02* (2006.01)

(52) U.S. Cl. .................................................. 356/457

(58) Field of Classification Search .............. 356/457, 356/458
See application file for complete search history.

(56) References Cited

U.S. PATENT DOCUMENTS

| | | | |
|---|---|---|---|
| 3,715,164 A | | 2/1973 | Heflinger |
| 3,782,825 A | | 1/1974 | Lackner |
| 3,829,838 A | * | 8/1974 | Lewis et al. .................. 345/419 |
| 3,907,438 A | | 9/1975 | Holeman |
| 4,324,456 A | * | 4/1982 | Dalisa ........................ 359/296 |
| 5,144,460 A | * | 9/1992 | Barbanell .................... 359/29 |
| 5,335,062 A | * | 8/1994 | Hofmeister et al. .......... 356/457 |
| 5,757,757 A | * | 5/1998 | Kim ....................... 369/112.09 |
| 5,932,887 A | * | 8/1999 | Guzik .................... 250/559.29 |
| 5,974,162 A | * | 10/1999 | Metz et al. .................. 382/124 |
| 5,986,746 A | * | 11/1999 | Metz et al. ..................... 356/71 |
| 6,056,696 A | * | 5/2000 | Kallman ..................... 600/459 |
| 6,061,463 A | * | 5/2000 | Metz et al. .................. 382/124 |
| 6,078,392 A | * | 6/2000 | Thomas et al. .............. 356/457 |
| 6,262,818 B1 | | 7/2001 | Cuche et al. |
| 6,280,960 B1 | * | 8/2001 | Carr ........................... 435/7.2 |
| 6,633,656 B1 | * | 10/2003 | Picard ........................ 382/124 |

(Continued)

FOREIGN PATENT DOCUMENTS

EP      1524491 A1      4/2005

(Continued)

OTHER PUBLICATIONS

Marquet, P., Rappaz, B., Magistretti, P. J., Cuche, E., Emery, Y., Colomb, T., and Depeursinge, C.. 2005. "Digital Holographic Microscopy: A Noninvasive Contrast Imaging Technique Allowing Quantitative Visualization of Living Cells with Subwavelength Axial Accuracy." Optic Letters. vol. 30, No. 5, pp. 468-470.

(Continued)

*Primary Examiner*—Gregory J Toatley
*Assistant Examiner*—Scott M Richey
(74) *Attorney, Agent, or Firm*—Robert Varkonyi; Courtney M. Dunn; Smith & Hopen, P.A.

(57) ABSTRACT

The present invention provides for a digital holographic microscope using a holographic interferometer and incorporating a TIR sample mount and microscopic imaging optics. The microscope uses phase shifting from frustrated internal reflection within a prism to measure nanometric distances. The invention also provides for a numerical reconstruction algorithm of an inclined surface of the object/prism.

7 Claims, 26 Drawing Sheets

U.S. PATENT DOCUMENTS

| | | | |
|---|---|---|---|
| 6,643,026 B2 * | 11/2003 | Kanda et al. | 356/512 |
| 6,747,771 B2 * | 6/2004 | Thomas et al. | 359/32 |
| 7,009,700 B2 | 3/2006 | Dubois et al. | |
| 7,119,905 B2 | 10/2006 | Bingham et al. | |
| 7,127,109 B1 | 10/2006 | Kim | |
| 7,148,969 B2 | 12/2006 | Thomas et al. | |
| 7,298,532 B2 | 11/2007 | Thomas et al. | |
| 7,362,449 B2 | 4/2008 | Dubois et al. | |
| 7,365,855 B2 * | 4/2008 | Ho et al. | 356/450 |
| 7,365,858 B2 | 4/2008 | Fang-Yen et al. | |
| 7,463,366 B2 | 12/2008 | Dubois et al. | |
| 7,486,406 B2 | 2/2009 | Kim | |
| 7,505,138 B2 | 3/2009 | Guthals et al. | |
| 7,616,320 B2 | 11/2009 | Javidi et al. | |
| 2006/0132799 A1 | 6/2006 | Dubois et al. | |
| 2009/0073450 A1 * | 3/2009 | Boyd et al. | 356/454 |
| 2009/0116030 A1 * | 5/2009 | Bahuguna | 356/457 |
| 2010/0014098 A1 * | 1/2010 | Suzuki et al. | 356/512 |

FOREIGN PATENT DOCUMENTS

| | | |
|---|---|---|
| GB | 1435134 | 5/1976 |
| WO | 2004/102111 A1 | 11/2004 |
| WO | 2006/090320 A1 | 8/2006 |

OTHER PUBLICATIONS

Rappaz, B., Marquet, P., Cuche, E., Emery, Y., Depeursinge, C., Magistretti, P.J. 2005. "Measurement of the Integral Refractive Index and Dynamic Cell Morphometry of Living Cells with Digital Holographic Microscopy." Optical Society of America. vol. 13, No. 23.

Grilli, S.; Ferraro, P.; De Nicola, S.; Finizio, A.; Pierattini, G.; Meucci, R. 2001. "Whole optical wavefields reconstruction by Digital Holography." Optics Express. vol. 9, No. 6, pp. 294-302.

Schwarzer, R. A. 1997. "Advances in crystal orientation mapping with the SEM and TEM." Ultramicroscopy. vol. 67, pp. 19-24.

Jensen, D. J. 1997. "Applications of orientation mapping by scanning and transmission electron microscopy." Ultramicroscopy. vol. 67, pp. 25-34.

Cheng, Y.; Wyant, J.C. 1984. "Two-wavelength phase shifting interferometry." Applied Optics. vol. 23, No. 24, pp. 4539-4543.

Overwijk, M.H.F.; Bleeker, A.J.; Thust A. 1997. "Correction of threefold astigmatism for ultra-high-resolution TEM." Ultramicroscopy. vol. 67, pp. 163-170.

Buck, E.C.; Fortner, J.A. 1997. "Detecting love levels of transuranics with electron energy loss spectroscopy." Ultramicroscopy. vol. 67, pp. 69-75.

Xu, L.; Peng, X.; Miao, J.; Asundi, A.K. 2001. "Studies of digital microscopic holography with applications to microstructure testing." Applied Optics. vol. 40, No. 28, pp. 5046-5051.

Fortner, J.A.; Buck, E.C.; Ellison, A.J.G.; Bates, J.K. 1997. "EELS analysis of redox in glasses for plutonium immobilization." Ultramicroscopy. vol. 67, pp. 77-81.

Dooley, J.; De Graef, M. 1997. "Energy filtered Lorentz microscopy." Ultramicroscopy. vol. 67, pp. 113-131.

Boyes, E.D.; Gai, P.L. 1997. "Environmental high resolution electron microscopy and applications to chemical science." Ultramicroscopy. vol. 67, pp. 219-232.

Mann, C.J.; Yu, L.; Lo, C.; Kim, M.K. 2005. "High-resolution quantitative phase-contrast microscopy by digital holography." Optic Express. vol. 13, No. 22.

Goyal, A.; Specht, E.D.; Wang, Z.L.; Kroeger, D.M. 1997. "Grain boundary studies of high-temperature superconducting materials using electron backscatter Kikuchi diffraction." Ultramicroscopy. vol. 67, pp. 35-57.

Spence, J.C.H. 1997. "Imaging moving dislocation kinks and buried interfaces by HREM." Ultramicroscopy. vol. 67, pp. 171-180.

Wang, Z.L. 1997. "Lattice imaging using plasmon energy-loss electrons in an energy-filtered transmission electron microscope." Ultramicroscopy. vol. 67, pp. 105-111.

Beeli, C.; Doudin, B.; Ansermet, J.-Ph.; Stadelmann, P.A. 1997. "Measurement of the remanent magnetization of single Co/Cu and Ni nanowires by off-axis TEM electron holography." Ultramicroscopy. vol. 67, pp. 143-151.

Harada,K.; Matsuda, T.; Kasai, H.; Kamimura, O.; Tonomura, A. 1997. "Observation of dynamic interaction of vortices with ion irradiated defects by Lorentz microscopy." Ultramicroscopy. vol. 67, pp. 133-141.

Qin, L.C.; Ichihashi, T.; Iijima, S. 1997. "On the measurement of helicity of carbon nanotubes." Ultramicroscopy. vol. 67, pp. 181-189.

Adams, B.L. 1997. "Orientation imaging microscopy: Emerging and future applications." Ultramicroscopy. vol. 67, pp. 11-17.

Hofer, F.; Grogger, W.; Kothleitner, G.; Warbichler, P. 1997. "Quantitative analysis of EFTEM elemental distribution images." Ultramicroscopy. vol. 67, pp. 83-103.

Field, D.P. 1997. "Recent advances in the application of orientation imaging." Ultramicroscopy. vol. 67, pp. 1-9.

Isabell, T.C.; Dravid, V.P. 1997. "Resolution and sensitivity of electron backscattered diffraction in a cold field emission gun SEM." Ultramicroscopy. vol. 67, pp. 59-68.

Singhal, A.; Yang, J.C.; Gibson, J.M. 1997. "STEM-based mass spectroscopy of supported Re clusters." Ultramicroscopy. vol. 67, pp. 191-206.

Thomas Jr., C.E.; Hunt, M.A.; Bahm, T.M.; Baylor, L.R.; Bingham, P.R.; Chidley, M.D.; Dai, X.; Delahanty, R.J.; El-Khashab, A.; Gilbert, J.M.; Goddard, J.S.; Hanson, G.R.; Hickson, J.D.; Hylton, K.W.; John, G.C.; Jones, M.L.; Mayo, M.W.; Merek, C.; Price, J.H.; Rasmussen, D.A.; Scaefer, L.J.; Schulze, M.A.; Shen, B.; Smith, R.G.; Su, A.N.; Tobin, K.W.; Usry, W.R.; Voelkl, E.; Weber, K.S.; Owen, R.W. 1997. "Direct to Digital Holography for High Aspect Ratio Inspection of Semiconductor Wafers." www.ornl.gov/.

Stetson, K. 1968. "Total Internal Reflection Holography." Laser Focus. vol. 4, pp. 30-31.

Dehm, G.; Scheu, C.; Mobus, G.; Brydson, R.; Ruhle, M. 1997. "Synthesis of analytical and high-resolution transmission electron microscopy to determine the interface structure of Cu/Al2O3." Ultramicroscopy. vol. 67, pp. 207-217.

Zweck, J.; Zimmermann, T.; Schuhrke, T. 1997. "TEM imaging and evaluation of magnetic structures in Co/Cu multilayers." Ultramicroscopy. vol. 67, pp. 153-162.

* cited by examiner

A. Intensity Graph 2.62E+3 um x 200 um x 2.7E-7~0.00423(256 x 40)

B. X-Section

A.

2.62E + 3um x 200um x 2.7E-7~0.00423 (256 x 40)

B.

A.  Intensity Graph 2.62E + 3um x 200um x 2.7E-7~0.00423 (256x 40)

B.  X-Section

A.  Intensity Graph 2.62E + 3um x 200um x 2.7E-7~0.00423 (256x 40)

B.  X-Section ered to as digital holography (U. Schnars, *Direct Phase Determination in Hologram Interferometery with Use of Digitally Recorded Holograms*, J. Opt. Soc. Am., A 11, 2011-5 (1994)).

TOTAL INTERNAL REFLECTION HOLOGRAPHIC MICROSCOPE

CROSS REFERENCE TO RELATED APPLICATIONS

This application is a continuation of currently pending U.S. patent application Ser. No. 12/053,978, entitled "Total Internal Reflection Holographic Microscope", filed Mar. 24, 2008, which claims the benefit of priority of U.S. Provisional Patent Application 60/896,381, entitled, "Total Internal Reflection Digital Holographic Microscope", filed Mar. 22, 2007, which are both herein incorporated by reference.

FIELD OF INVENTION

This invention relates to holographic microscopes. More specifically, this invention relates the use of frustrated TIR to measure cellular and cellular substrate interfaces.

BACKGROUND OF THE INVENTION

In cellular biology, there are many compelling questions involving processes that take place directly at the cell surface or plasma membrane. Cell-substrate interactions including attachment, spreading, morphology changes, and migration require a complex series of events to occur in a regulated and integrated manner. Cell migration, for example, plays an important role in numerous physiological and pathological processes, such as morphogenesis, wound healing, and tumor metastasis. It has been known to involve a number of coordinated events, including the protrusion of pseudopodia, the formation of new adhesions, the development of traction, and the release of old adhesions. To date, the primary tools for imaging and studying these processes have been total internal reflection fluorescence microscopy (TIRFM) and interference reflection microscopy (IRM).

Dennis Gabor invented holography in 1948 while attempting to improve the resolution of electron microscopy. Invention of the laser and the introduction of off-axis holography in the early 1960's provided the critical elements to make holography a practical and powerful tool in many areas, including microscopy, metrology, data storage, and optical processing (P. Harihan, *Optical Holography*, 2d Ed. (Cambridge U. Press, 2004)). In 1967, J. Goodman demonstrated the feasibility of numerical reconstruction of a holographic image using a densitometer-scanned holographic plate (J. W. Goodman, R. W. Lawrence, *Digital Image Formation from Electronically Detected Holograms*, Appl. Phy. Lett., 11, 77-79 (1967)).

In the IRM technique, light waves reflected from the two surfaces at the cell-substrate interface produce interference fringes, thus allowing estimation of interface thickness profile. However, here the interference image of the interface is usually complicated by the reflection image of the cell body and its contents, allowing only a qualitative interpretation of the surface profile.

In 1981, Axelrod (P. Harihan, *Optical Holography*, 2d Ed. (Cambridge U. Press, 2004)) demonstrated total internal reflection fluorescence microscopy (TIRFM) was effective in studying cell-substrate contacts, and it now enjoys wide employment in the biomedical industry. TIRFM uses a higher-index medium n1, and a lower-index medium n2 to reflect incident light back into the first medium. The light does not propagate into the second medium, except for an evanescent wave field, whose amplitude decays exponentially over a distance a fraction of a wavelength (~λ/3). This evanescent wave field excites the fluorophores in TIRFM, and the penetration distance is determined by the wavelength of the incident light signal and the indices of refraction. Therefore, the sensitivity depth is adjustable by varying these parameters subject to physical constraints such as sample opacity and occlusion. Magnification of a hologram in real space holography is mostly impractical. In TIRFM, fluorophores within ~100 nm of the coverslip's surface are excited by the evanescent field of total internal reflection, thus providing a very thin optical sectioning effect at the interface coupled with a dramatic increase in signal-to-noise ratio (SNR). Together with the exquisite specificity of GFP (green fluorescent proteins), TIRFM is used for imaging protein dynamics in calcium channels, neurotransmitters, focal adhesion, and other cellular membrane processes. On the other hand, information on the morphology of the cellular membrane surface is largely absent in TIRFM. Schnars and Jueptner, in 1994, were the first to use a CCD camera connected to a computer to record a holographic image, completely eliminating the photochemical process, in what is now referred to as digital holography (U. Schnars, *Direct Phase Determination in Hologram Interferometery with Use of Digitally Recorded Holograms*, J. Opt. Soc. Am., A 11, 2011-5 (1994)). Since then, developments of digital holographic techniques and applications have been gaining pace ever more rapidly. In digital holography (J. W. Goodman, R. W. Lawrence, *Digital Image Formation from Electronically Detected Holograms*, Appl. Phy. Lett., 11, 77-79 (1967)), the holographic interference between the object and reference fields is created optically and recorded electronically by a CCD camera. The propagation of optical field is completely and accurately described by diffraction theory, which allows numerical reconstruction of the image as an array of complex numbers representing the amplitude and phase of the optical field (J. W. Goodman, R. W. Lawrence, *Digital Image Formation from Electronically Detected Holograms*, Appl. Phy. Lett., 11, 77-79 (1967)). Reconstruction of the object image is carried out numerically inside a computer as an array of complex numbers. Numerical reconstruction of holographic images allows numerous imaging and processing techniques that are difficult or impossible to implement in real-space holography. A number of different methods have been considered for numerical reconstruction including Fresnel transform, Huygens convolution, and angular spectrum analysis (S. Grilli, et al., *Whole Optical Wavefields Reconstructed by Digital Holography*, Opt. Express 9, 294-302 (2001)). Additionally, special techniques have been developed to enhance the capabilities and to extend the range of applications. Phase-shifting digital holography allows elimination of zero-order and twin-image components even in an on-axis arrangement (P. Harihan, *Optical Holography*, 2d Ed. (Cambridge U. Press, 2004)). Optical scanning holography can generate holographic images of fluorescence (T. C. Poon, *Three-Dimensional Image Processing and Optical Scanning Holography*, Adv. Imaging & Electon Phys. 126, 329-350 (2003)). Three-channel color digital holography has also been demonstrated (I. Yamaguchi, et al., *Phase Shifting ColorDigital Holography*, Opt. Lett. 27, 1108 (2002)).

Optical profilers based on scanning interferometer are well suited for quantitative phase imaging applications in materials science, as in MEMS and nanofabrication (Y. Y. Cheng, J. C. Wyant, *Two Wavelength Phase Shifting Interferometry*, Appl. Opt. 23, 4539-43 (1984)), but the speed constraint and mechanical complexity can significantly restrict the range of applications in biology (X. Li, et al., *Full Field Quantitative Phase Imaging by White-Light Interferometry with Active Phase Stabilization and its Application to Biological*

*Samples*, Opt. Lett. 31, 1830-1832 (2006)). There have been some recent developments in two-dimensional quantitative phase microscopy. In phase-shifting interference microscopy (J. Beuthan, et al., *The Spatial Variation of the Refractive Index in Biological Cells*, Phys. Med. Biol. 41, 369-382 (1996)), the quantitative phase image is obtained from a combination of three or more interferograms. There is also a non-interferometric method to extract quantitative phase image from differential focusing property of bright-field intensity images alone (A. Barty, et al., *Quantitative Optical Phase Microscopy*, Opt. Lett. 23, 817-9 (1998)).

Application of digital holography in microscopy is especially important, because of the very narrow depth of focus of high-magnification systems. Numerical focusing of holographic images can be accomplished from a single hologram. Direct accessibility of phase information can be utilized for numerical correction of various aberrations of the optical system, such as field curvature and anamorphism (P. Ferraro, et al., *Compensation of the Inherent Wave Front Curvature in Digital Holographic Coherent Microscopy for Quantitative Phase-Contrast Imaging*, Appl. Opt. 42, 1938-46 (2003)). Digital holography has been particularly useful in metrology, deformation measurement, and vibrational analysis (M. L. Xu, et al., *Studies of Digital Microscopic Holography with Applications to Microstructure Testing*, Appl. Opt. 40, 5046-5051 (2001)). Microscopic imaging by digital holography has been applied to imaging of microstructures and biological systems. Digital interference holography has been developed for optical tomographic imaging as well as multiwavelength phase contrast digital holography for high resolution microscopy.

Therefore, with the limitations of TIRFM and IRM in mind, it becomes readily apparent that a technique to generate accurate, quantitative surface profile images of live cellular membranes is needed and will greatly help us better understand the important process of cellular motion. Therefore, a quantitative method that takes advantage of the strengths of TIRFM, without suffering from its above-mentioned drawbacks, would have useful applications in surface profile characterization and the study of cellular motion. With this motivation in mind, a solution is offered by digital holographic microscopy.

SUMMARY OF THE INVENTION

Digital holography is used to generate quantitatively precise images of the cell-substrate interface. TIRHM makes use of the phase shift that accompanies frustrated total internal reflection (fTIR) when an evanescent field of TIR is interrupted by the presence of another interface or inhomogeneity. For example, a cellular specimen is placed on a prism and an illumination from below the prism surface undergoes fTIR. The fTIR light, whose phase front is modulated by the presence of cellular adhesion, is then superposed with a reference beam, to generate holographic interference. A CCD camera records the resultant hologram and a computer calculates the optical field at the cell-prism interface. TIR microscopy by digital holography affords unique capabilities not feasible or practical in real space imaging. The calculation of the optical field as an array of complex numbers directly yields the phase profile of light after fTIR, thereby representing the optical thickness variation of the cell-prism gap with nanometric precision. Numerical reconstruction also allows for imaging of the optical field over a plane positioned at an arbitrary distance and orientation, while imaging through a prism at a large inclination in real space is not feasible using conventional optical systems. When light is incident from inside of a higher-index medium (n1) into a lower-index one (n2), with the angle of incidence greater than the critical angle given by $\theta = \sin(n2/n1)$, all of the incident light is reflected back to the first medium. There is no propagating field in the second medium, except for the evanescent wave, whose amplitude decays exponentially over a distance of a fraction of a wavelength. Although the evanescent field is non-propagating, it can be made to give off propagating, and therefore detectable, radiation. When a second interface, a n2/n3 interface, is brought close to the first n1/n2 interface, then part of the evanescent wave couples into the second n1 medium and propagates, a process known as frustrated TIR (fTIR). The characteristics of the evanescent field are effected by inhomogeneity in the index n2 of the second medium, scattering the evanescent field.

There are two very unique capabilities of digital holography that are not feasible or practical in real space imaging. The first is that the calculation of the optical field as an array of complex numbers directly yields the phase profile of light after TIR, thereby representing the optical thickness variation of the cell-prism gap with nanometric precision. The other is that numerical reconstruction allows for imaging of the optical field over a plane positioned at an arbitrary distance and orientation, and is therefore capable of including the large inclination angle with respect to the optical axis that is necessary for this approach.

Imaging through a prism at a large inclination in real space is not feasible using conventional optical systems. However, with the mathematical power inherent in the numerical processing capability of digital holography, this imagery is achievable. Numerical diffraction on to an inclined plane has been considered by several authors[5], but existing algorithms are either very slow or provide only approximate solutions for small inclination angles. We are developing much more general algorithms based on angular spectrum analysis.

While various methods for numerical reconstruction exist (i.e., the Fresnel transform, the Huygens convolution), the angular spectrum method has notable advantages in computation speed and versatility.

A holographic interferometer was constructed incorporating a TIR sample mount and microscopic imaging optics. A laser input beam is split into two parts, objective (OBJ) and reference (REF), by a beam splitter and later recombined, forming a Michelson or Mach-Zehnder interferometer. The path of the objective and reference beams are directed using reflectors such as pentacrystals, which cause the beams to undergo total internal reflection through the crystal, or mirrors.

A prism is placed in the path of the objective beam. The beam enters the prism and undergoes total internal reflection at the hypotenuse of the prism. The presence of the cellular surface near the interface results in frustrated TIR which modulates the phase front of the reflected light and produces a fTIR-phase modulated hologram. The beam is recombined with a reference beam, allowing a measure of the phase modulation. Microscope objective lenses may be placed next to the prism to project a magnified image of the hologram to an image recorder. Lenses may optionally be included to magnify the recombined hologram image. Additionally, a prism and lenses may optionally be added to the reference beam path to compensate for the prism and lenses within the objective beam path.

The image may be recorded by an image recorder, as known in the art. Example include a CCD camera, like a Sony XCD710C, or a microscope camera, such as a CMOS-based camera like Clemex L (Clemex Technologies, Longueuil, Canada). Preferably, the objective and reference arms are configured symmetrically, to improve stability against mechanical and optical noise. In one embodiment, the reference arm follows a path right next and parallel to the object path, including the TIR of the prism. This reduces the effect of mechanical noise and make the apparatus more compact and robust.

The fTIR occurring at the object plane A modulates the phase front of a plane wave, which propagates (diffracts) to the hologram plane H. The imaging system is focused on H and the CCD records the resulting holographic interference pattern. Then the numerical reconstruction starts from this recorded pattern at H and is numerically propagated back to A, which is at an inclination angle $\beta$, in order to calculate the phase profile at A. This numerically calculated phase profile at A reflects the cellular surface profile that is within 200 nm or so of the interface.

The holographic microscope may be illuminated by means known in the art, using collimated electromagnetic energy. Examples include gas and crystal lasers, collimated LED light, xenon arc lamps, and mercury vapor lamps. Beams of the electromagnetic energy are optionally spatial-filtered and expanded, and the relative intensity between the object and reference beams adjusted using the polarizing beam-splitters together with two polarizers before and after the interferometer. In TIRHM, almost 100% of input light intensity is captured by the camera, while the image information is contained in the phase profile of the reflected light. Therefore, only a minimal amount of light energy is needed to illuminate the system. Moreover, the actual light entering the cellular specimen is a small fraction of the evanescent wave. This implies that TIRHM has the potential to achieve highest SNR with minimum light intensity, in comparison with IRM and TIRFM.

The TIRHM is inherently anamorphic-magnifications are unequal in the x- and y-directions-because of the incline of the object plane. Superficially, this can be dealt with by numerically stretching the image in the 'compressed' direction by resampling and interpolation. Optionally, a cylindrical lens may be employed in the beam path to optically stretch the rectangular field into a square.

Digital holography offers a number of important advantages such as the ability to acquire images rapidly, availability of both amplitude and phase information of the optical field, and versatility of the image processing techniques that can be applied to the complex field data. Of particular significance for holographic microscopy, the holographic interference pattern can be straightforwardly magnified by a lens and accounted for in reconstruction by proper resealing of the numerical parameters.

BRIEF DESCRIPTION OF THE DRAWINGS

For a fuller understanding of the invention, reference should be made to the following detailed description, taken in connection with the accompanying drawings, in which:

FIGS. 5(a) through 5(d) is a graph of the reflection phase shift $\phi$ versus incident angle $\theta_1$ (in degrees and the interface thickness $z_0$ (in units of wavelength $\lambda_0$) for $n_1=1.5$, $n_2=1.33$, and $n_3=1.375$.

DETAILED DESCRIPTION OF THE PREFERRED EMBODIMENT

Total Internal Reflection Holographic Microscopy (TIRHM) makes use of the phase shift that accompanies frustrated total internal reflection (fTIR) when an evanescent field of TIR is interrupted by the presence of another interface or inhomogeneity. For example, a cellular specimen is placed on a prism and an illumination from below the prism surface undergoes TIR. The TIR light, whose phase front is modulated by the presence of cellular adhesion, is then superposed with a reference beam, to generate holographic interference. A CCD camera records the resultant hologram and a computer calculates the optical field at the cell-prism interface. The calculation of the optical field as an array of complex numbers directly yields the phase profile of light after TIR, thereby representing the optical thickness variation of the cell-prism gap with nanometric precision. Numerical reconstruction also allows for imaging of the optical field over a plane positioned at an arbitrary distance and orientation, while imaging through a prism at a large inclination in real space is not feasible using conventional optical systems.

Figure 1:
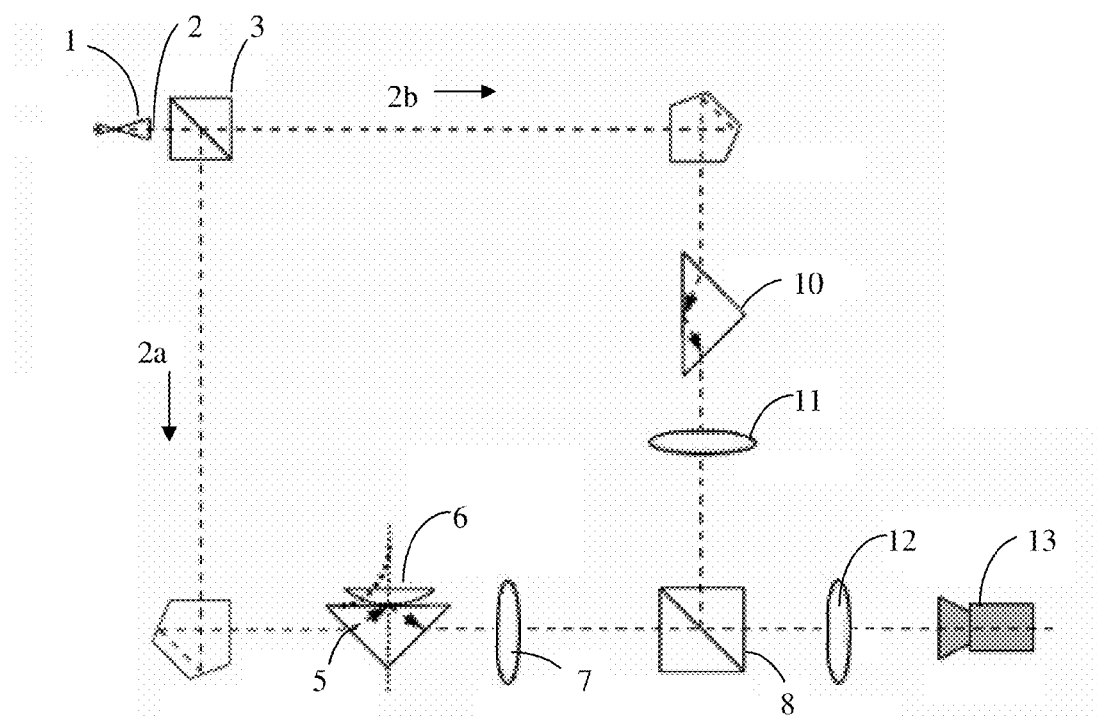
FIG. 1 is a diagram of the TIRHM microscope system. The MachZehnder split-beam interferometer is created with beam splitters and penta-prisms. The sample is placed on an objective prism and amplified with microscopic lenses. Matching prism and lenses are placed in the reference arm to compensate for the optical aberrations caused in the objective arm.

The basic topology of the apparatus is a modified split-beam Mach-Zehnder interferometer depicted in FIG. 1. A prism in the object arm of the apparatus creates the evanescent wave field used for sensing. The object beam enters the prism and undergoes total internal reflection at the hypotenuse of the prism thus illuminating the object of interest with the evanescent wave field. The presence of the cellular surface near the interface results in a frustrated TIR, which modulates the phase front of an electromagnetic energy source, which includes laser and LED light beams. The lenses, objective lens 7 and microscopic image lens 14 form a microscopic pair to project a magnified image of a plane (hologram plane) near the object on to the CCD camera. The objective beam 2a combines with the reference beam 2b with a slight angle for off-axis configuration. Once the CCD captures the interference pattern, the computer algorithm reconstructs the optical field of specimen object 6 as an array of complex numbers. The phase of the reconstructed optical field is modulated by the phase shift that accompanies frustrated TIR when a second interface (n2/n3) is brought close to the first interface (n1/n2). This phase shift occurs within the penetration depth of about $\delta \sim \lambda/3$, or 200 nm if 600 nm light is used, and therefore can be used to make precise measurements of the interface thickness to within a few 100 nm.

Figure 2:
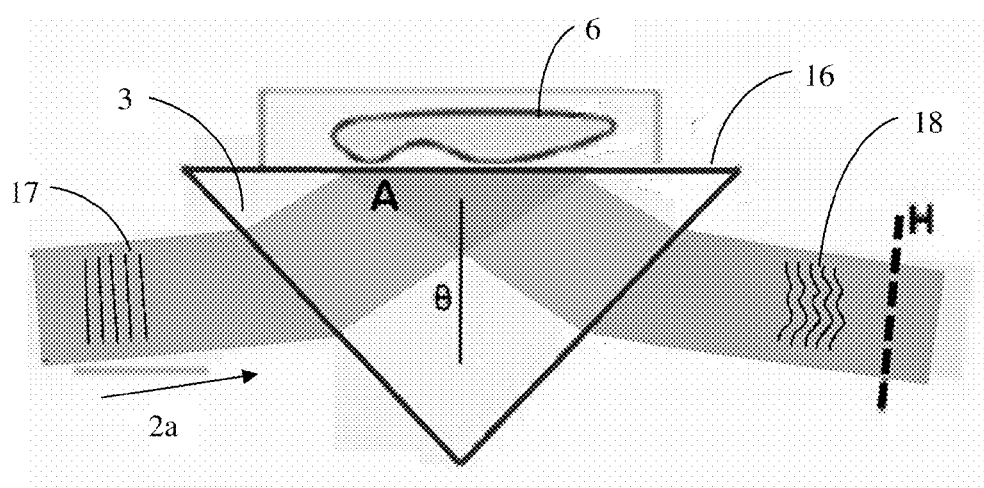
FIG. 2 is a diagram showing the basic configuration of total internal reflection digital holography.
Figure 3:
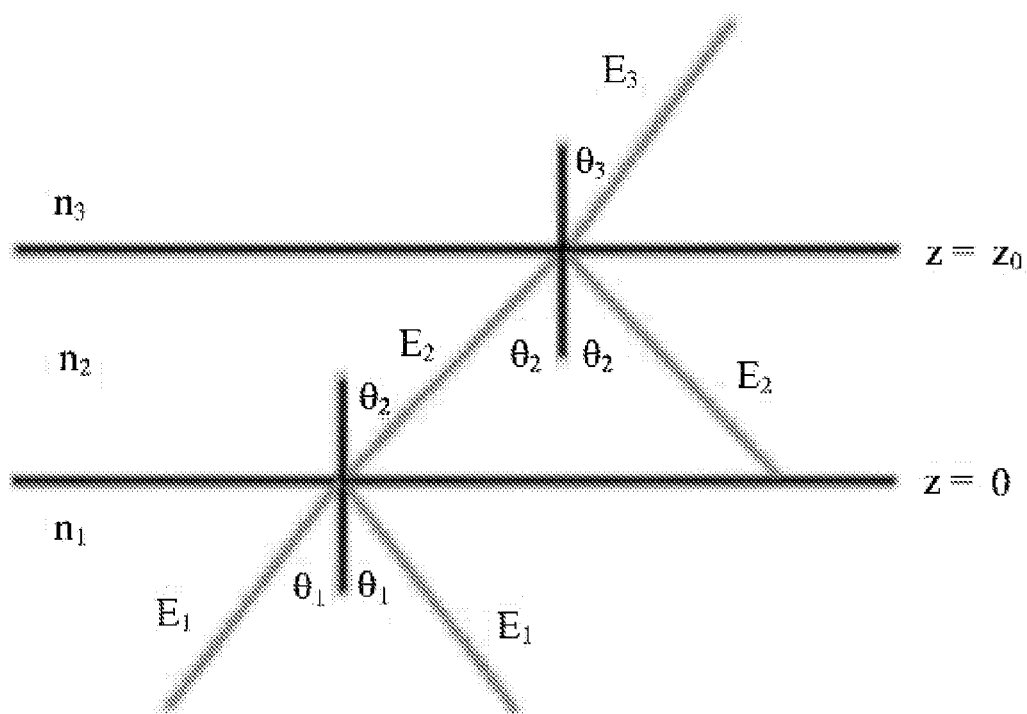
FIG. 3 depicts the geometry of frustrated total internal reflection (fTIR).
Figure 4:
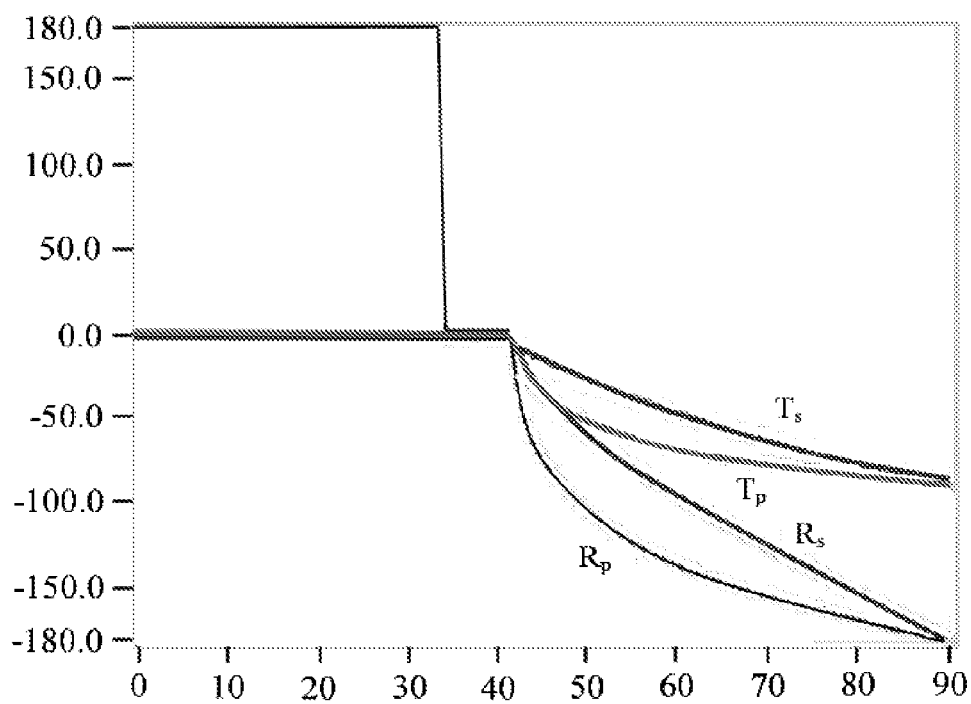
FIG. 4 is a graph of the phase shift of reflection at the first interface $n_1/n_2$.

The phase profile of light reflected from an object can readily be obtained by digital holography. The optical system for TIRHM is shown in FIG. 2. A collimated (plane wave) laser beam is incident from left, with the horizontal angle adjusted so that it is incident on the hypotenuse (labeled 16) of the prism with an angle $\theta=66°$. The angle $\theta$ in FIG. 2 corresponds to $\theta_1$ in FIG. 3, and the particular value 66° and other numerical values that follow from it are used as plausible illustration. Then the light undergoes total internal reflection at A, as seen in FIG. 4, but its phase front is modulated by the presence of the cellular contact at the interface. A hologram is then set up at a suitable hologram plane H by superposing with a reference beam (not shown). From the hologram, the image of the optical field at plane A is calculated by numerical propagation of the optical wave from H to A. But looking through a prism of index 1.5, the object plane A appears to be inclined at an angle of $\beta=\tan^{-1}(n\tan\theta)=73°$ with respect to the hologram plane H. Numerical diffraction on to an inclined plane has been considered by several authors[45-47], but existing algorithms are either very slow or provide only approximate solutions for small inclination angles.

Figure 5:
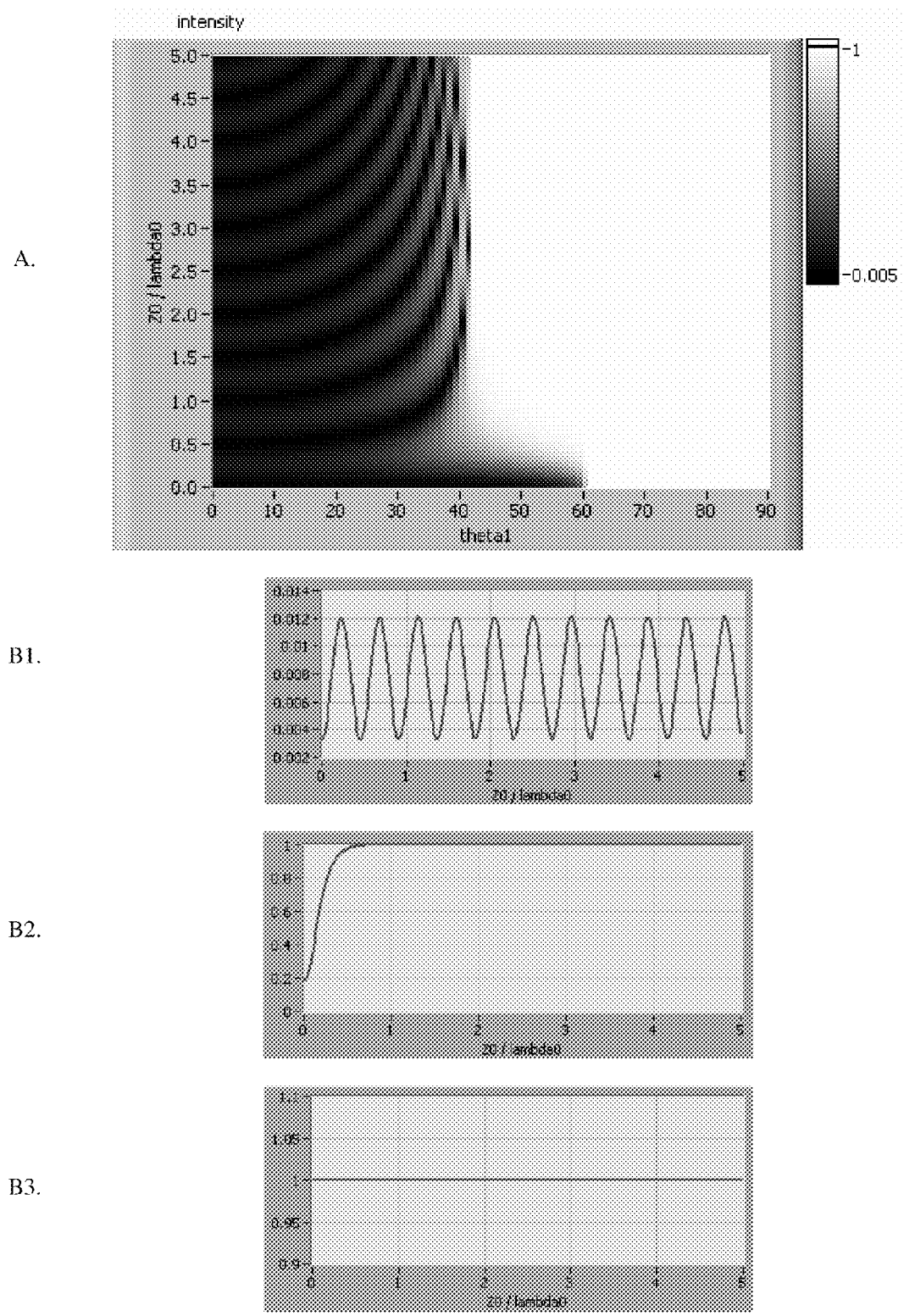
FIG. 5 shows the reflection intensity of fTIR versus the angle of incidence and layer thickness. (a) shows the reflection intensity versus incident angle $\theta_1$ (in degrees and the interface thickness $z_0$ (in units of wavelength $\lambda_0$) for $n_1=1.5$, $n_2=1.33$, and $n_3=1.375$. A cross sectional graph of the reflectance $|r|^2$ versus $z_0/\lambda_0$ is shown at (b) 30° (c) 57°, and (d)70°.
Figure 6:
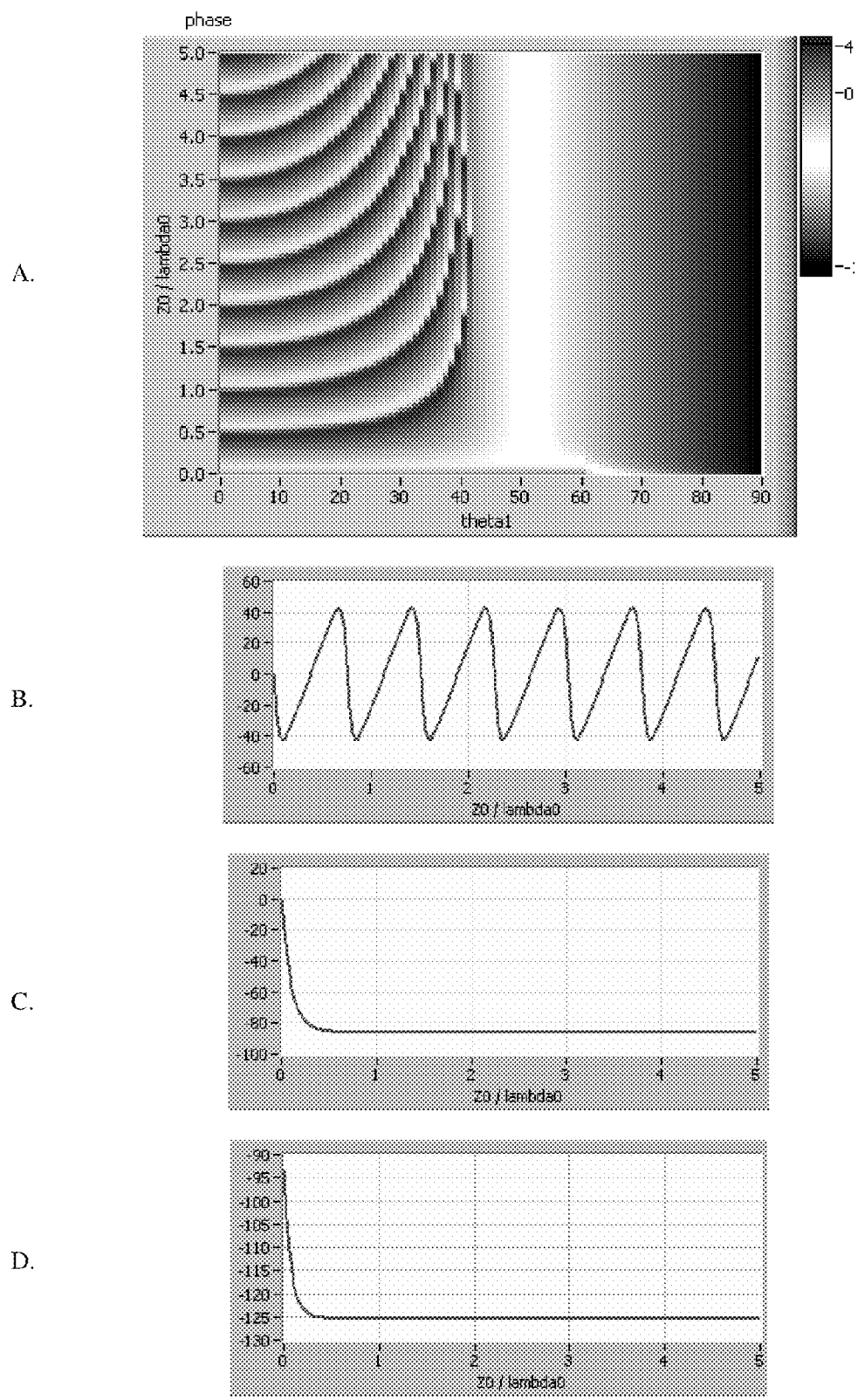
FIG. 6 shows the reflection phase shift $\phi$ of fTIR versus the angle of incidence and layer thickness. (a) shows the reflection phase shift $\phi$ versus incident angle $\theta_1$ (in degrees and the interface thickness $z_0$ (in units of wavelength $\lambda_0$) for $n_1=1.5$, $n_2=1.33$, and $n_3=1.375$. A cross sectional graph of the phase variation $\phi$ versus $z_0/\lambda_0$ is shown at (b) 30° (c) 57°, and (d)70°.

For an interface between two media with indices of refraction $n_1$ and $n_2$, the critical angle is $\theta=\sin^{-1}(n_2/n_1)$. For an incident angle $\theta_i > \theta_c$ the reflectance equals unity and there is a phase shift $\phi = -2\tan^{-1}(\sqrt{\sin^2\theta_1 - n_2^2/n_1^2}/\cos\theta)$ assuming that the polarization is perpendicular to the plane of incidence. The total internal reflection is accompanied by the evanescent wave which does not propagate, but exponentially decays over a distance comparable to the wavelength. In so-called frustrated total internal reflection (fTIR), one can bring another interface into the vicinity of the evanescent wave, and allow a part of the evanescent wave to propagate into the third medium. Using the geometry shown in FIG. 3, the complex reflection coefficient is calculated to be $$\frac{E'_1}{E_1} = \frac{(h_1-h_2)(h_2+h_3)+(h_1+h_2)(h_2-h_3)\exp(2i\varphi_0 h_2)}{(h_1+h_2)(h_2+h_3)+(h_1-h_2)(h_2-h_3)\exp(2i\varphi_0 h_2)} = |r|\exp(i\varphi),$$

where $h_i = n_i \cos\theta_i$ ($i=1, 2, 3$) and $\phi_0 = k_0 z_0 = 2\pi z_0/\lambda_0$, $\lambda_0$ being the vacuum wavelength. Further, $h_2 = n_2 \cos\theta_2 = \sqrt{n_2^2 - n_1^2 \sin^2\theta_1}$ and $h_3 = n_3 \cos\theta_3 = \sqrt{n_3^2 - n_1^2 \sin^2\theta_1}$. For an evanescent wave, $h_i = n_i \sqrt{1-\sin^2\theta_i}$, is imaginary. The intensity, seen in FIG. 5, and reflection phase shift $\phi$, seen in FIG. 6 are plotted versus the incident angle $\theta_1$ and the interface thickness $z_0$ (in units of wavelength $\lambda_0$). Here we assume $n_1=1.5$, $n_2=1.33$, and $n_3=1.375$, approximating a glass-water-biological cell interface system. The critical angle for the 1-2 interface (glass-water) is $\theta_{12c}$62.5°, while for the 1-3 interface (glass-cell) is $\theta_{13c}=66.4°$. For an incident angle $\theta_1$ such that $\theta_1 < \theta_{12c} < \theta_{13c}$, a part of the evanescent wave escapes into the third medium. The calculation shows that as the layer thickness $z_0$ increases from 0 to about $\lambda/3$ (~200 nm if $\lambda_0=600$ nm), the reflectance increases from about 53% to 100%, see FIG. 6(b), while the phase shift changes from 0 to about 57°, seen in FIG. 6(a). Therefore, over the range of $z_0 < 200$ nm, the phase shift is a monotonic function and a convenient measure of the layer thickness, with precision of a few nanometers.

A light incidence angle of $\theta=66°$ was tested for total internal reflection. After confirming the incident angle resulted in proper TIR, a custom-made, glass prism with a 48-degree apex angle was acquired, so that light enters and exits the prism at normal incidence. This allowed the microscope objective to be placed as close to the prism as possible, improving the design optically and mechanically. An additional microscope objective may be positioned above the prism for monitoring the sample and alignment of TIR optics.

Example 1

Figure 7:
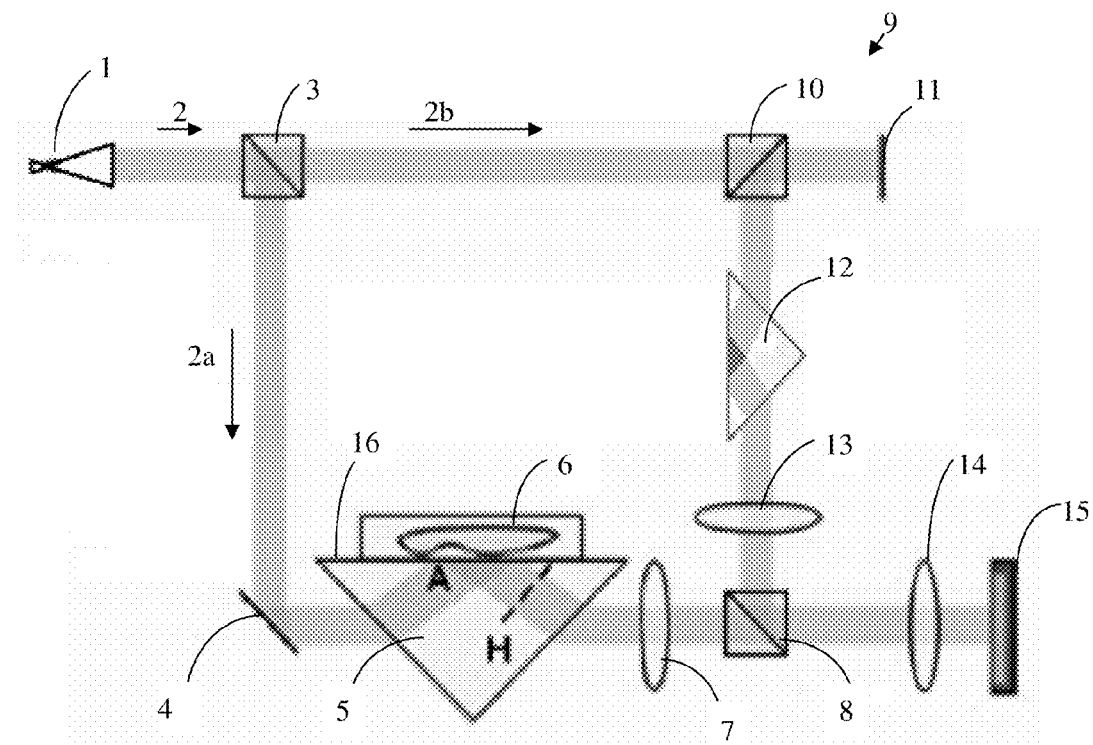
FIG. 7 is a diagram of the TIRHM microscope system using mirror and beam splitters to direct the beam path.

A holographic interferometer was constructed incorporating a TIR sample mount and microscopic imaging optics. FIG. 7 shows one embodiment of the interferometer for digital holographic microscopy of total internal reflection (TIRHM). A laser input beam (yellow HeNe; $\lambda=594$ nm) 2 is emitted from beam emitter 1 and split into two parts, objective beam 2a and reference beam 2b, by beam splitter 3. The objective beam travels to objective reflector 4, where the beam undergoes reflection and is directed toward objective prism 5. The objective beam strikes one face of the prism and undergoes refraction toward the hypotenuse of the prism. Upon striking hypotenuse boundary 16 of objective prism 5, the beam undergoes total internal reflection. To analyze an object, object specimen 6 is placed on the hypotenuse of objective prism 5, causing the objective beam to undergo frustrated total internal reflection. The reflected objective beam travels through the objective prism and exits the prism opposite the entering objective beam, whereby the objective beam undergoes a second refraction. Objective beam 2a travels through objective lens 7, whereby the beam is magnified. The magnified objective beam then travels to beam splitter 8.

Reference beam 2b travels from beam splitter 3 to reference reflector subassembly 9, which preferably includes beam splitter 10 and mirror 11. Mirror 11 is disposed behind beam splitter 3, such that reference beam 2b strikes the beam splitter before striking mirror 11. Mirror 11 is adapted to move along the reference beam path, thus allowing adjustment of the beam splitter 10-mirror 11 distance to match the object beam optical distance and allowing a user to lengthen or shorten the path distance of reference beam 2b. Such adjustment allows matching reflections in the reference arm that of the object arm, ensuring the reference and object beams overlap with the correct transverse orientation, and reducing the effect of any instability in laser frequency. The beam reflection and is directed toward beam splitter 8. While not required, the distance between reference reflector subassembly 9 and beam splitter 8 is preferably interrupted by a reference prism 12 and reference lens 13 which are optically identical to objective prism 5 and objective lens 7, and compensate for the optical effects of the objective prism and objective lens, however no object is placed onto reference prism 12. Reference beam 2b travels to beam splitter 8 and is recombined with objective beam 2a, forming a Mach-Zehnder interferometer. The recombined beam, consisting of objective beam 2a, modified by a frustrated total internal reflection, and reference beam 2b travel through microscopic image lens 14 and are recorded by image recorder 15. Image recorder 15, is preferably a CCD camera, like a Sony XCD710C.

For TIRHM, object specimen 6 is mounted on top of a prism, seen in FIG. 2. For example, a slide glass with cells in an aqueous buffer is placed on top of object prism 5, with a drop of immersion oil sealing the contact between the prism and the slide. Imaging through the object prism 5 calls for special considerations, because the size of the prism constrains the working distance of the objective lens 7, which in turn places a limit on how close hologram plane H can be to object plane A. Due to these requirements of magnification, resolution, and working distance, object prism 5 consists of a small prism, magnified by a medium magnification objective lens 7, and a set of microscopic image lens 14 that relay and condition the intermediate image from objective lens 7.

Example 2

Figure 8:
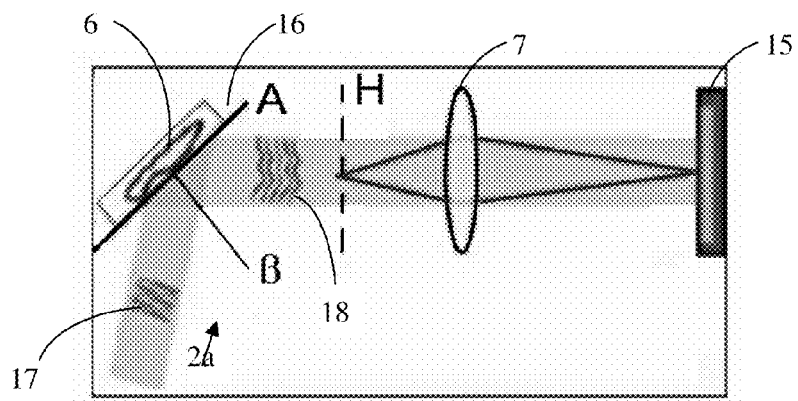
FIG. 8 is a simplified diagram of the optical path between the object plane and image recorder.

Objective beam 2a, consisting of an unaltered phase indicated by unaltered phase marker 17, enters objective prism 5 and undergoes total internal reflection at the hypotenuse 16 of the prism, as seen in FIGS. 2 and 8. The presence of the cellular surface near the interface results in frustrated TIR which modulates the phase front of the reflected light, indicated by altered phase marker 16, seen in FIGS. 2 and 8. The fTIR occurring at object plane A modulates the phase front of a plane wave, which propagates (diffracts) to hologram plane H. The imaging system is focused on hologram plane H and image recorder 15 captures the resulting holographic interference pattern. Numerical reconstruction starts from this recorded pattern at hologram plane H and is numerically propagated back to object plane A, which is at an inclination angle β, in order to calculate the phase profile at object plane A, as seen in FIG. 8. This numerically calculated phase profile at object plane A reflects the cellular surface profile that is within 200 nm or so of the interface. In-focus imaging of an inclined plane in conventional microscopy would be difficult, but in digital holography, the field can in principle be calculated on any plane with a great degree of freedom in its distance and orientation.

Example 3

Figure 9:
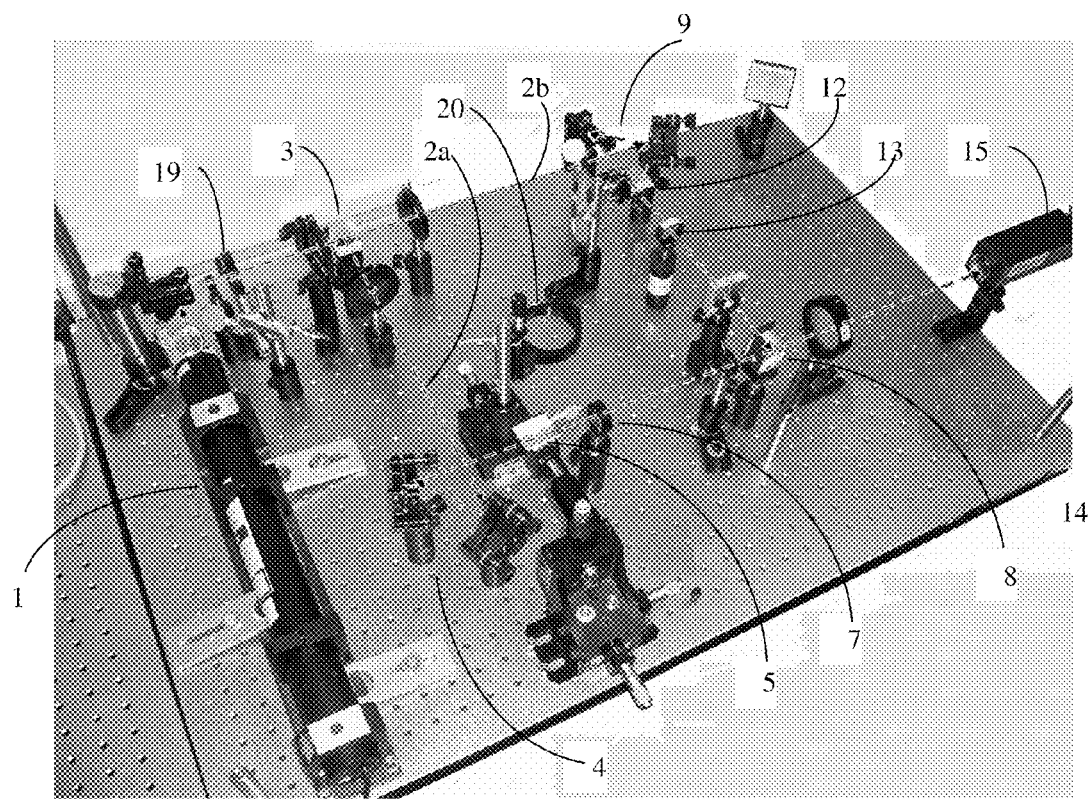
FIG. 9 is an image of the constructed TIRHM apparatus.

FIG. 9 shows the preferred configuration of the interferometer for digital holographic microscopy of total internal reflection (TIRHM). Beam emitter 1 is a HeNe yellow laser (λ=594 nm). The emitted beam 2 is expanded by beam expander 19 and strikes beam splitter 3 and is split into objective beam 2a and reference beam 2b. The object beam travels to objective reflector 4, which is a series of two mirrors disposed at 45 degree angles to the incoming objective beam 2a, and is directed toward objective prism 5. To analyze an object, object specimen 6 is placed in sample holder 20 and moved onto the hypotenuse of objective prism 5, causing the objective beam to undergo frustrated total internal reflection. The reflected objective beam travels through the objective prism and exits the prism opposite the entering objective beam. Objective beam 2a travels through the 40 mm objective lens 7, whereby the beam is magnified. The magnified objective beam then travels to beam splitter 8.

Reference beam 2b travels from beam splitter 3 to reference reflector subassembly 9, which preferably consists of a series of two mirrors disposed at 45 degree angles to the incoming objective beam 2a. The beam reflection and is directed toward beam splitter 8. Reference prism 12 and reference lens 13, consisting of a 40 mm lens, are disposed between reference reflector subassembly 9 and beam splitter 8, which are optically identical to objective prism 5 and objective lens 7, and compensate for the optical effects of the objective prism and objective lens. Reference beam 2b travels to beam splitter 8 and is recombined with objective beam 2a, forming a Mach-Zehnder interferometer. The recombined beam, consisting of objective beam 2a, modified by a frustrated total internal reflection, and reference beam 2b travel through microscopic image lens 14 and are recorded by image recorder 15. Image recorder 15, is preferably a CCD camera, like a Sony XCD710C.

Figure 10:
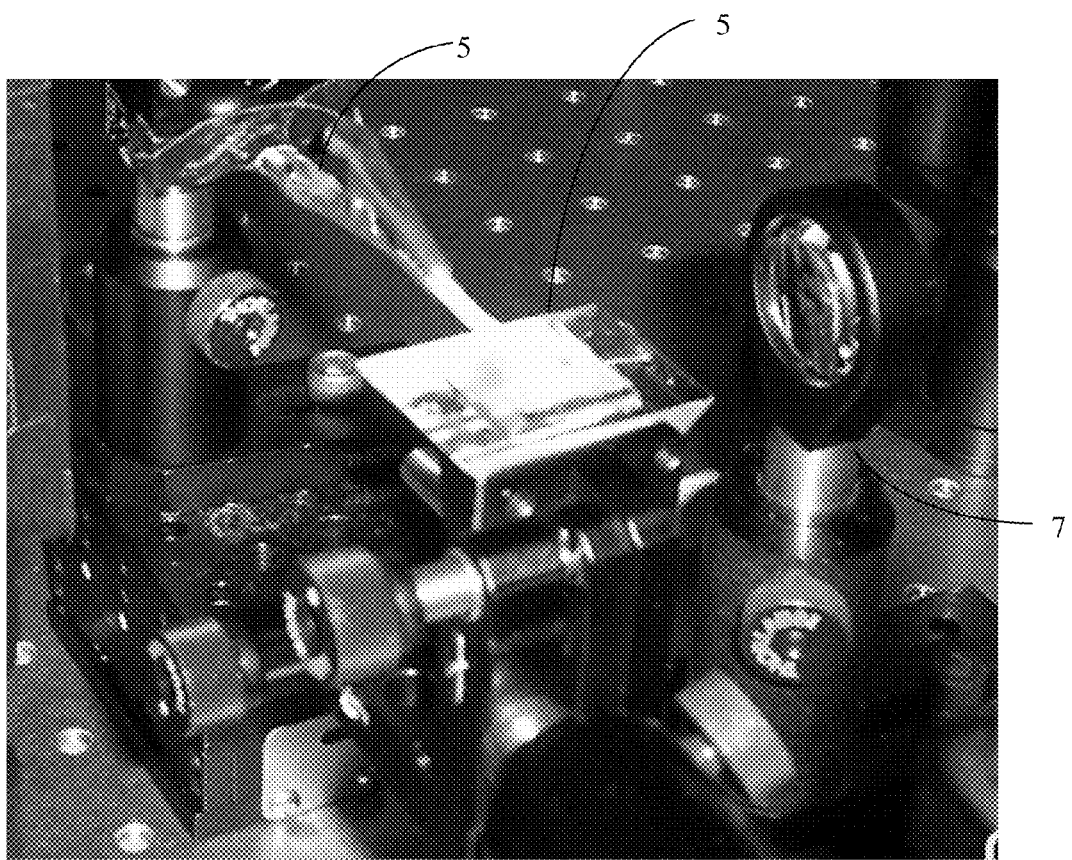
FIG. 10 is a blown up image of the objective prism, object sample holder, and objective lens of the TIRHM apparatus.
Figure 11:
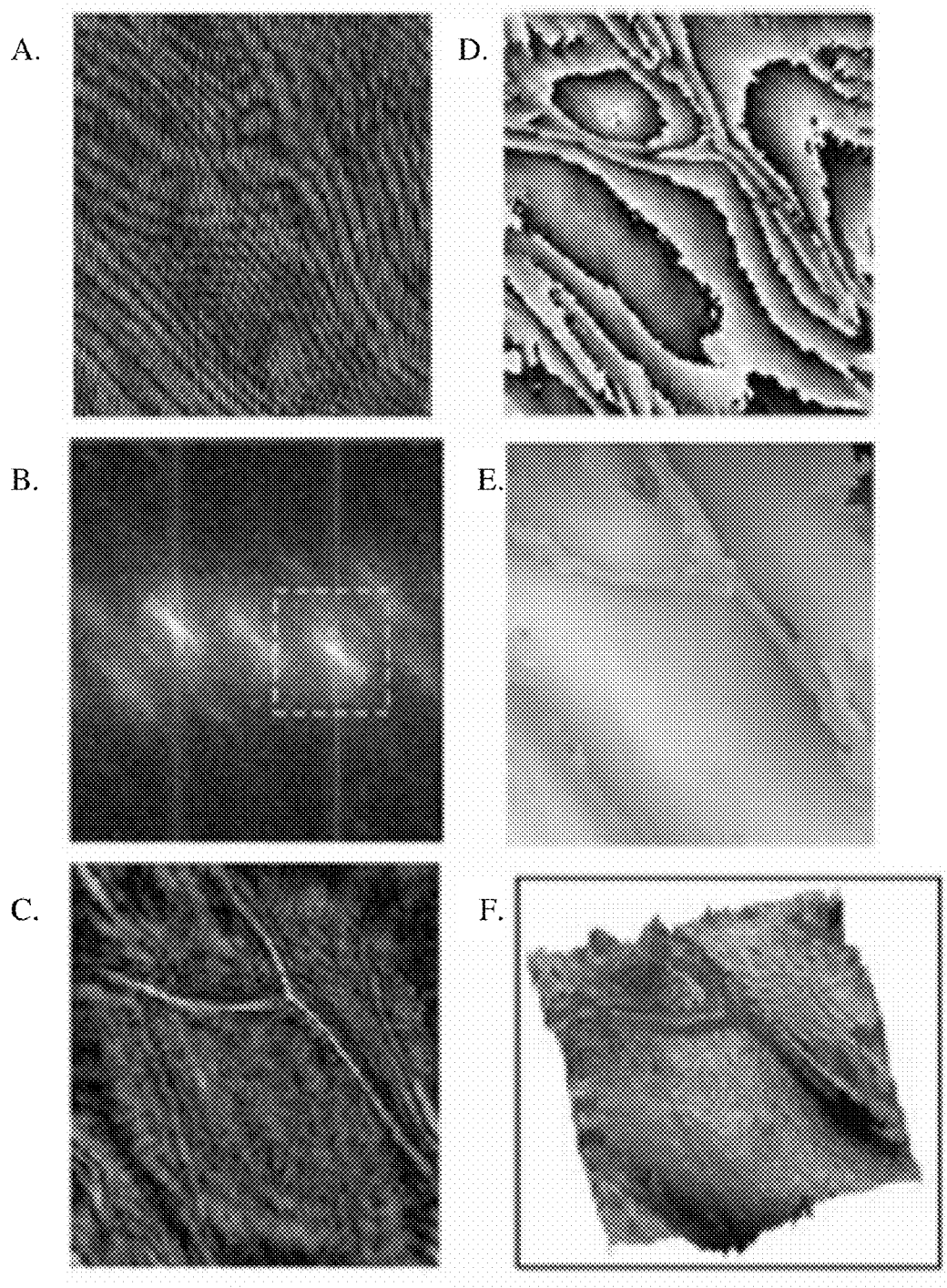
FIGS. 11(a) through (f) depict phase images constructed from digital holography. The images were taken from onion cells showing (a) the hologram image the image recorder obtains, (b) the angular spectrum captures, with highlighted zero order, and a series of first order components, (c) amplitude image reconstructed from a matrix of complex numbers, (d) wrapped phase image reconstructed from the matrix of complex numbers, (e) phase image unwrapped by a phase-unwrapping numerical algorithm, and (f) a phase image rendered as a pseudo-3D graphic.

For TIRHM, object specimen 6 is mounted on top of a prism, seen in closer view in FIG. 10. For example, a slide glass with cells in an aqueous buffer is placed on top of object prism 5, with a drop of immersion oil sealing the contact between the prism and the slide. Imaging through the object prism 5 calls for special considerations, because the size of the prism constrains the working distance of the objective lens 7. Due to the requirements of magnification, resolution, and working distance, object prism 5 consists of a small prism, magnified by a medium magnification objective lens 7.

Example 4

FIGS. 11(a)-(f) illustrate a typical phase imaging digital holography process, with images of a layer of onion cells. Interference of object and reference optical fields results in the hologram, FIG. 11(a), which is what the CCD camera records. The holographic microscopy apparatus consists of an interferometer, with microscopic imaging optics, to project on the camera a magnified image of the holographic interference pattern, as described above. Polarization optics were used for continuous adjustment of relative intensity between the two fields and a pair of objective lenses in the two arms allow matching of wavefronts curvatures.

An angular spectrum algorithm is preferably used in data image extrapolation. The angular spectrum normally contains a zero-order and a pair of first-order components, corresponding to the twin holographic images, as in FIG. 11(b). One of the first-order components can be separated from the others with a numerical band-pass filter if the off-axis angle of the reference beam is properly adjusted. The object field can then be rewritten as the inverse Fourier transform of the properly filtered angular spectrum. The field distribution after propagation over a distance z is then $E(x, y; z)=\iint F(k_x, k_y;0) \exp[i(k_x x+k_y y+k_z z)]dk_x dk_y$, where $k=[k2-k_x^2-k_y^2]^{1/2}$ and $k=2\pi/\lambda$. Distinct advantages of the angular spectrum method include consistent pixel resolution, no minimum reconstruction distance, easy filtering of noise and background components, and modest computational load. Numerical diffraction of the hologram results in the reconstructed optical field as a matrix of complex numbers, yielding the amplitude, seen in FIG. 11(c), and phase images, seen in FIG. 11(d). The phase image has 2π-discontinuities, if the object thickness variation is more than a wavelength. The phase image can be unwrapped using a phase-unwrapping numerical algorithm, as is done in FIG. 11(e), and rendered as a pseudo-3D graphics in FIG. 11(f). If done properly, this can bring out subtle features and textures not easily discernable in a flat 2D graphics.

Figure 12:
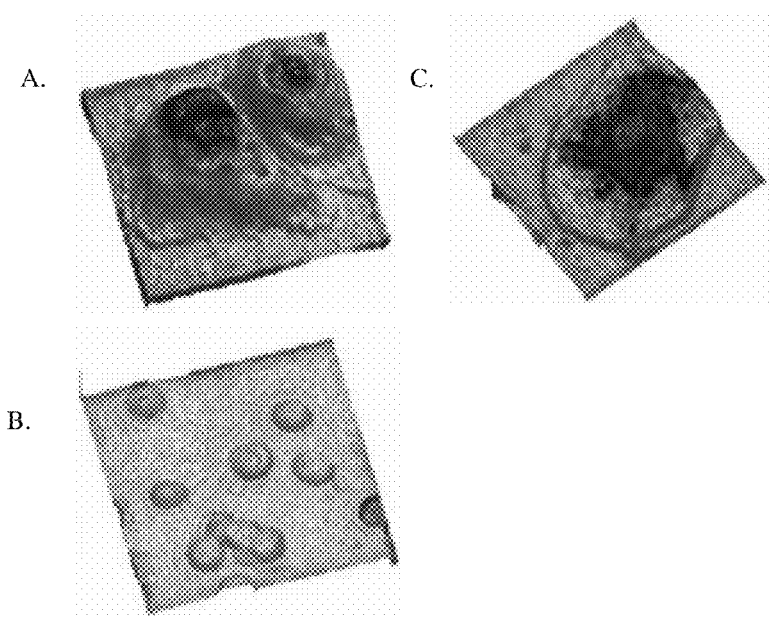
FIGS. 12(a) through (c) show examples of quantitative phase microscopy, using (a) SKOV-3 ovarian cancer cells, (b) red blood cells, and (c) cheek epithelial cells.
Figure 13:
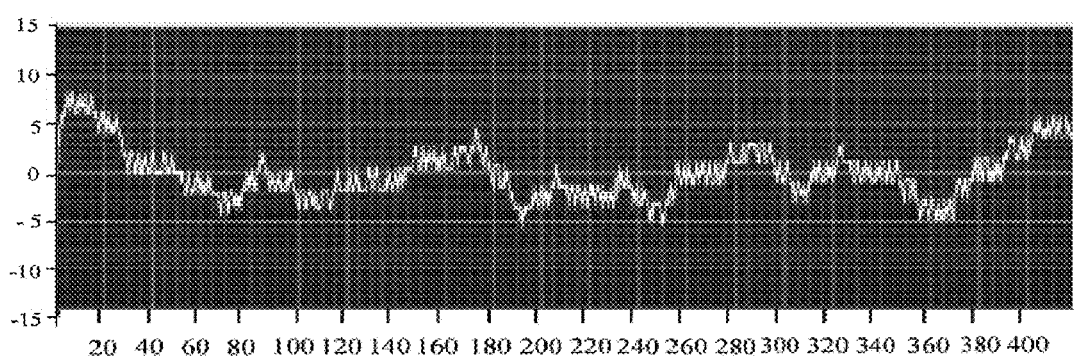
FIG. 13 is a graph of the profile of a glass slide.
Figure 14:
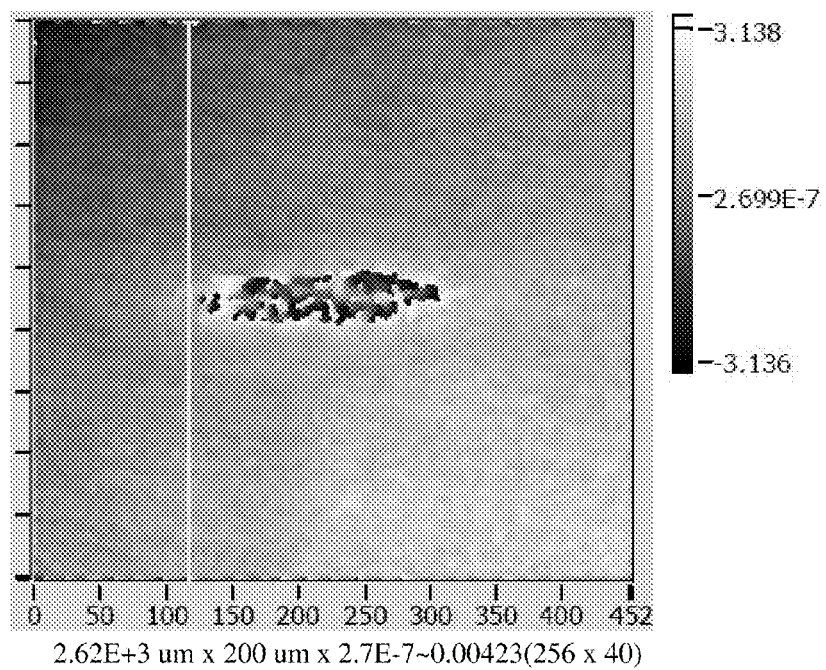
FIGS. 14(a) and (b) are captured phase images of a TIRHM hologram created by a plano-convex lens (radius of curvature≈150 mm for f=300 mm). The image represents phase shift due to evanescent wave signal, with a 250 m "spot" or "disk" representing the area of contact between the lens and prism surface where fTIR occurred. The image is (a) the left edge of feature and (b) the vertical phase cross-section of (a).
Figure 14:
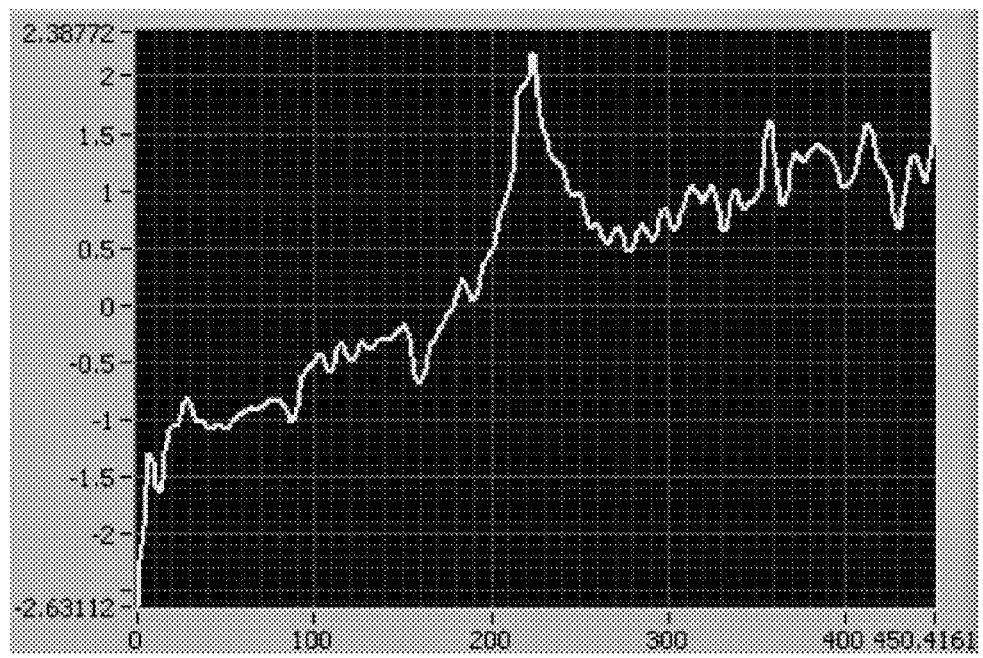
Figure 15:
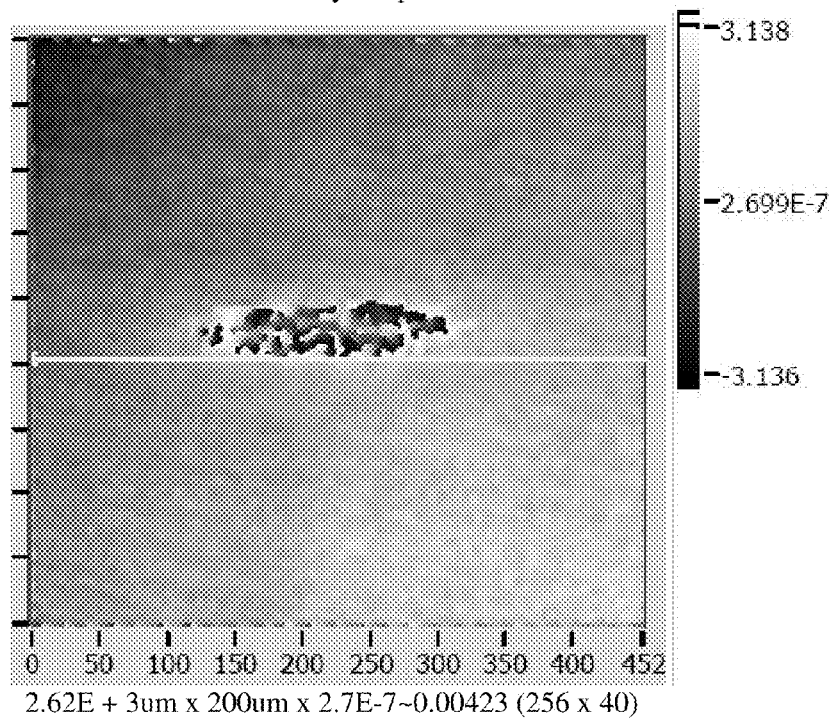
FIGS. 15(a) and (b) are captured phase images of a TIRHM hologram created by a plano-convex lens (radius of curvature≈150 mm for f=300 mm). The image represents phase shift due to evanescent wave signal, with a 250 m "spot" or "disk" representing the area of contact between the lens and prism surface where fTIR occurred. The image is (a) vertical phase cross-section through the 'interior' of the feature and (b) the vertical phase cross-section of (a).
Figure 15:
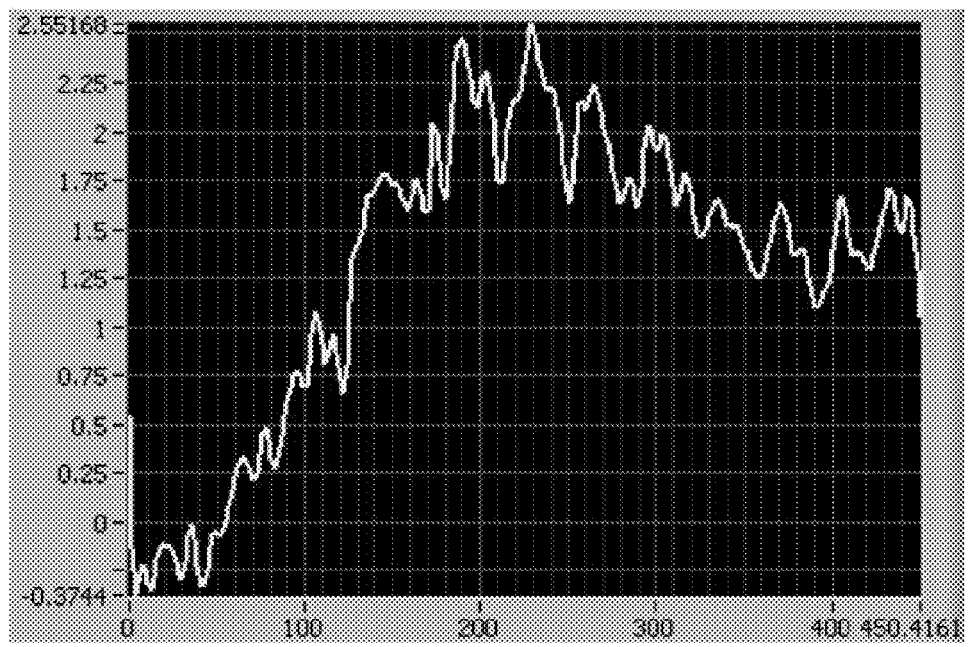
Figure 16:
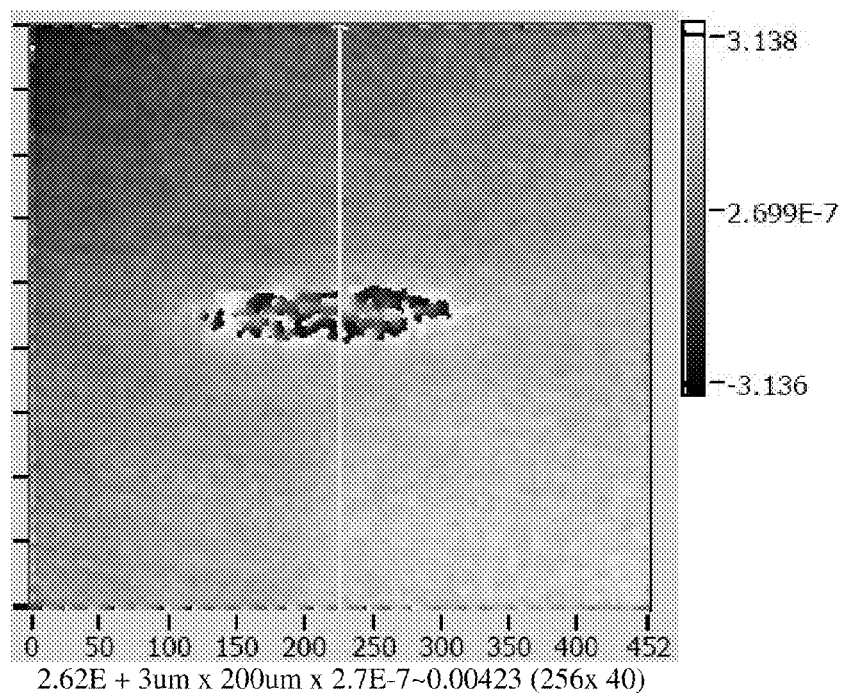
FIGS. 16(a) and (b) are captured phase images of a TIRHM hologram created by a plano-convex lens (radius of curvature 150 mm for f=300 mm). The image represents phase shift due to evanescent wave signal, with a 250 m "spot" or "disk" representing the area of contact between the lens and prism surface where fTIR occurred. The image is (a) the bottom edge of feature and (b) the horizontal phase cross-section of (a).
Figure 16:
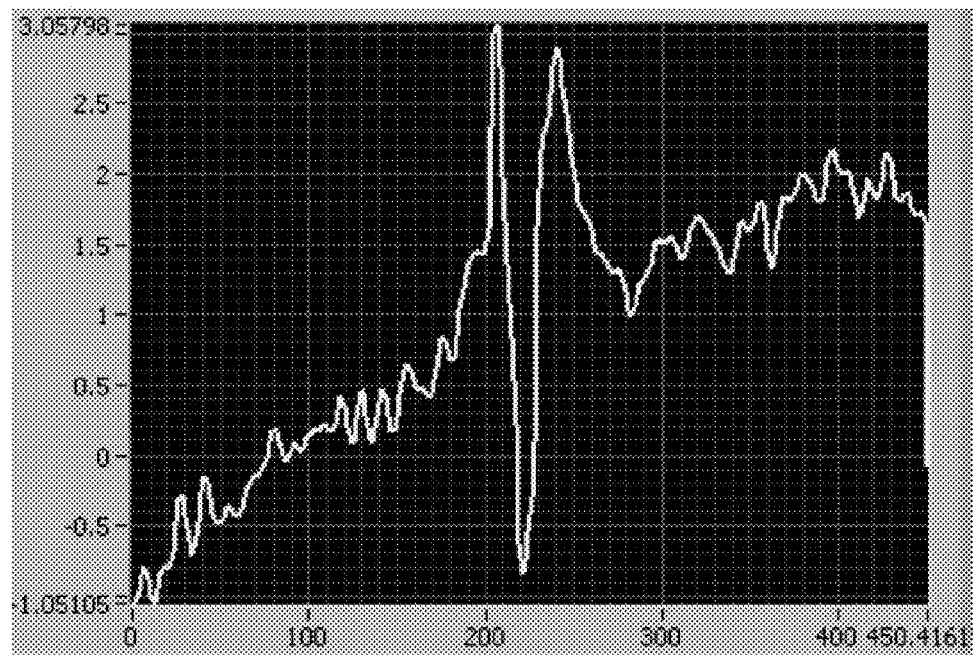
Figure 17:
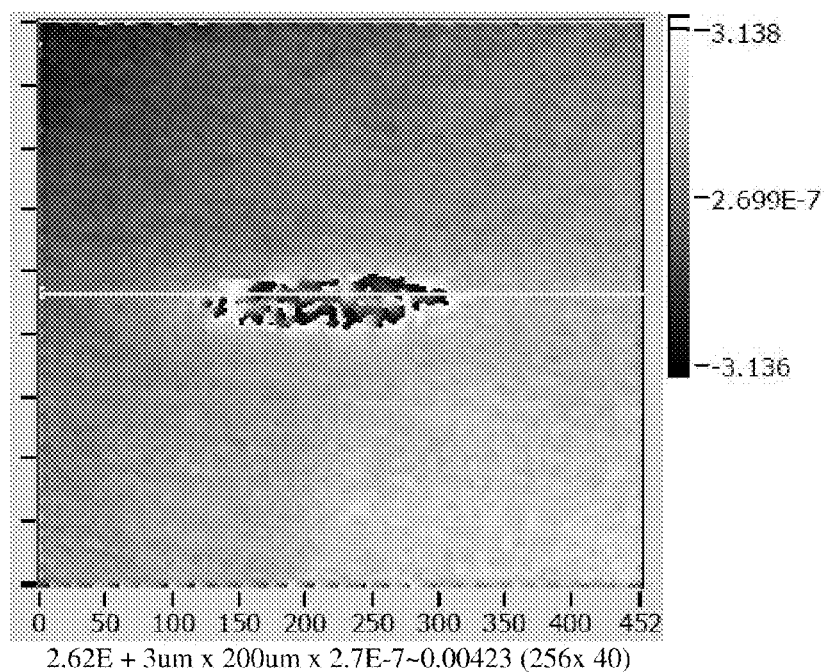
FIGS. 17(a) and (b) are captured, cross-section phase images of a TIRHM hologram created by a plano-convex lens (radius of curvature≈150 mm for f=300 mm). The image represents phase shift due to evanescent wave signal, with a 250 m "spot" or "disk" representing the area of contact between the lens and prism surface where fTIR occurred. The image is (a) the horizontal cross section through the 'interior' of the feature and (b) Horizontal phase cross-section of (a).
Figure 17:
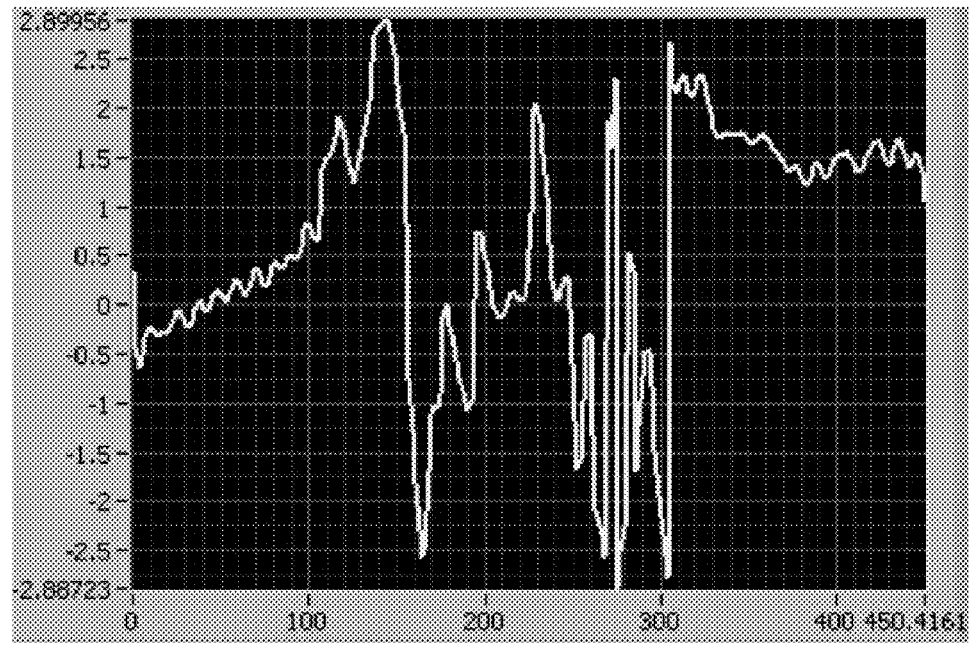

FIGS. 12(a) through 12 (c) are sample images taken of using quantitative phase microscopy. Cultured cells were fixed in formalin solutions and placed onto the microscope, and images of (a) SKOV-3 ovarian cancer cells, (b) red blood cells, and (c) cheek epithelial cells were obtained. FIG. 13 represents the profile of optical thickness for light transmitted through the cells on slide glass. The optical thickness profile of a glass substrate surface, where the full vertical scale is 30 nm The rms noise is about 3 nm in optical thickness or less than 2 degrees in phase. Such high precision in optical thickness will allow imaging of subtle variations in physical and biochemical conditions in cellular and intracellular structures. For example, an index variation of Δn=0.0003 of a 10 μm thick layer can be discerned by digital holographic phase microscopy.

Example 5

FIGS. 14(a) through 17(b) are phase image captures of a hologram created under TIRHM in the Mach-Zehnder system. The test object specimen is a standard laboratory piano-convex lens (radius of curvature 150 mm for f=300 mm) in ambient air placed with its convex surface upon the hypotenuse of the object prism 5 which is in TIR in the instrument's object beam. The resultant 'spot' or 'disk', about 250 μm in diameter, represents the area of contact between the two surfaces undergoing frustrated TIR. In a manner analogous to TIRFM, the interaction of the curved surface with the evanescent wavefield modulates the objective beam allowing the image to be reconstructed in a digital holograph. Note that, as anticipated, the image of the spot is tilted due to the tilt of the prism's hypotenuse with respect to the optical axis of the system. FIGS. 14(b), 15(b), 16(b) and 17(b) show the phase measurements of various cross sections as one traverses the spot's profile features. Further, phase shifts were observed associated with the object's phase profile features in FIGS. 14(a), 15(a), 16(a) and 17(a).

Figure 18:
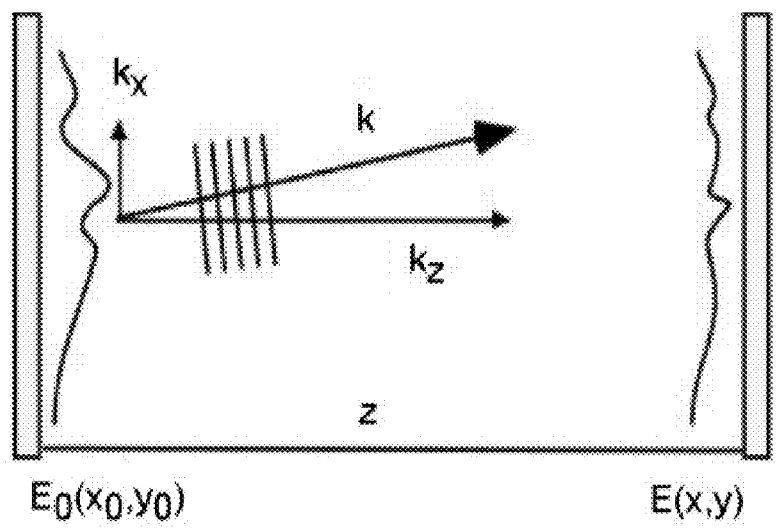
FIG. 18 is an illustration of the angular spectrum algorithm preferably used in data image extrapolation.
Figure 19:
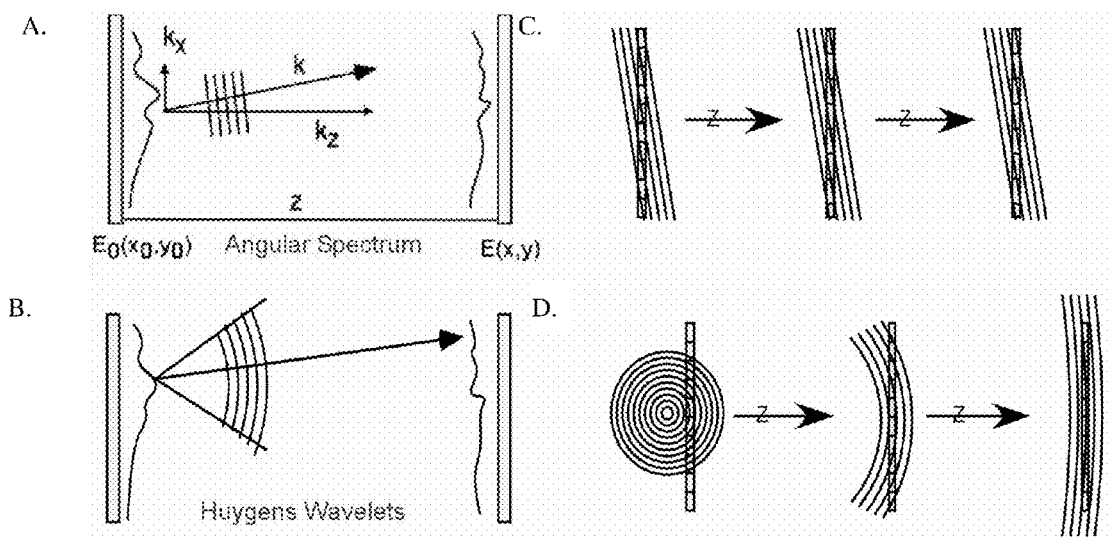
FIGS. 19(a) through 19(d) depict the wave functions of the angular spectrum and Huygens Wavelet. The wave propagation is illustrated for (a) the angular spectrum and (b) the Huygens Wavelet. The advantages of angular spectrum are illustrated as by the approaching wavefronts for (c) angular spectrum or (d) Huygens Wavelet.

An angular spectrum algorithm is preferably used in data image extrapolation. The angular spectrum of the image, at z=0 is $A(k_x, k_y, 0)=F\{E_0(x_0, y_0, 0)\}=\iint E_0(x_0, y_0, 0)\exp[-i(k_x x_0+k_y y_0)]dx_0 dy_0$. The optical wave is defined at z=0 as $E(k_x, k_y, 0)=F^{-1}\{A(k_x, k_y, 0)\}=\iint A(k_x, k_y, 0)\exp[i(k_x x_0+k_y y_0)]dk_x dk_y$, and the optical field as z is $E(x, y, z)=\iint A(k_x, k_y, 0)\exp[i(k_z z)]\exp[i(k_x x+k_y y)]dk_x dk_y=F^{-1}\{F\{E_0\}\exp[ik_z z]\}$, where $k_z=\sqrt{k^2-k_x^2-k_y^2}$, as illustrated in FIG. 18. It has been observed that the use of the angular spectrum algorithm has a number of advantages over the more commonly used Fresnel transform or Huygens convolution methods, as shown in FIGS. 19(a) through 19(d). Suppose $E_0(x_0, y_0)$ represents the two-dimensional optical field at the hologram plane, then its angular spectrum is the Fourier transform $F(k_x, k_y; 0)=\iint E_0(x_0, y_0)\exp[-i(k_x x_0+k_y y_0)]dx_0 dy_0$, where $k_j$, and $k_y$ are the spatial frequencies.

Figure 20:
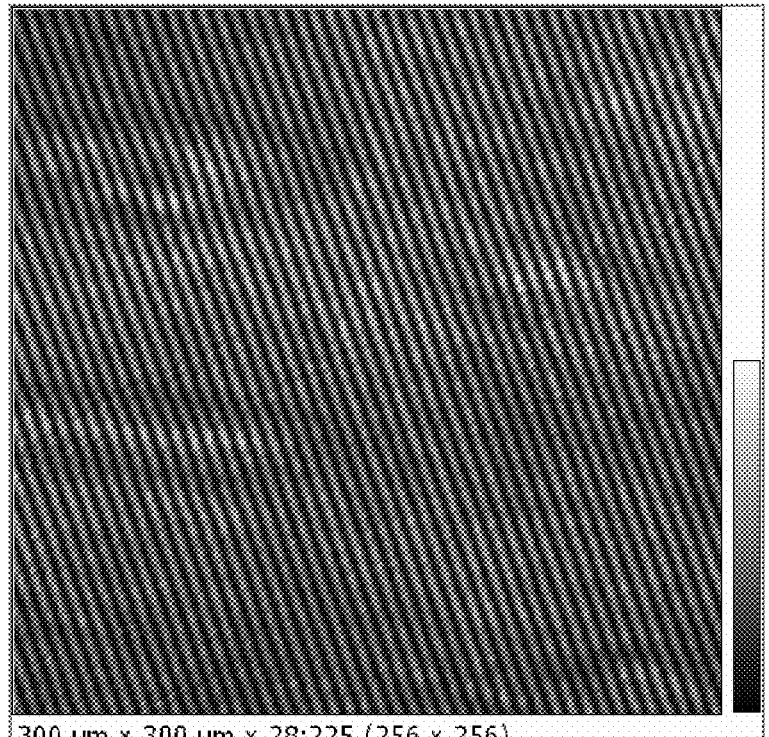
FIG. 20 is a hologram image taken from the TIRHM. Water droplets were placed on the face of the objective prism. Field of view is 300 μm horizontal×300 μm vertical. The 28:225 aspect ratio is due to the incline of the object plane. The grey scale is measured in radians.
Figure 21:
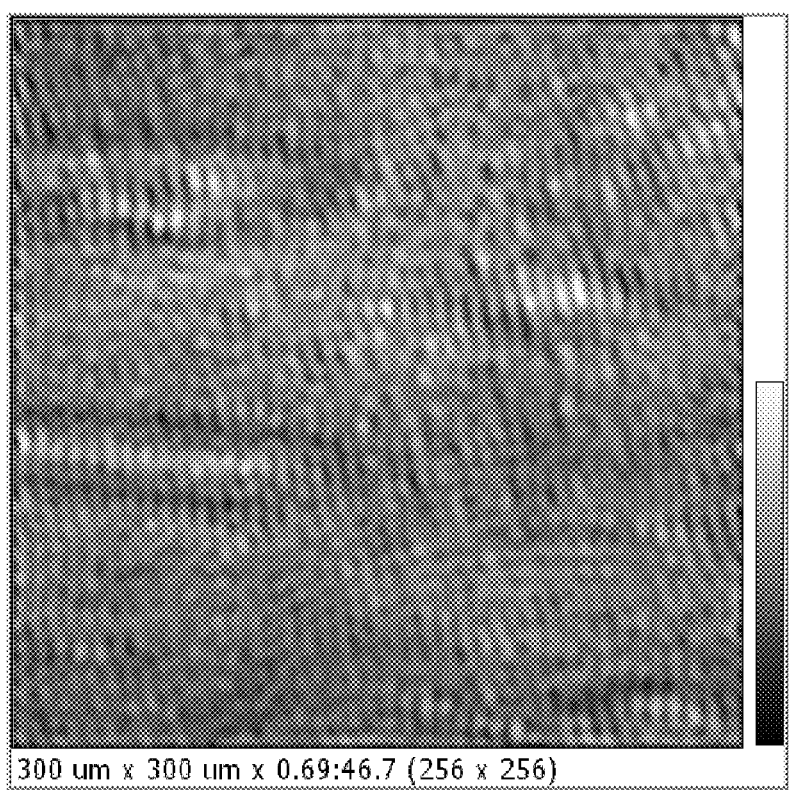
FIG. 21 is an image of the amplitude from the TIRHM. Water droplets were placed on the face of the objective prism. Field of view is 300 μm horizontal×300 μm vertical. The 28:225 aspect ratio is due to the incline of the object plane. The grey scale is measured in radians.
Figure 22:
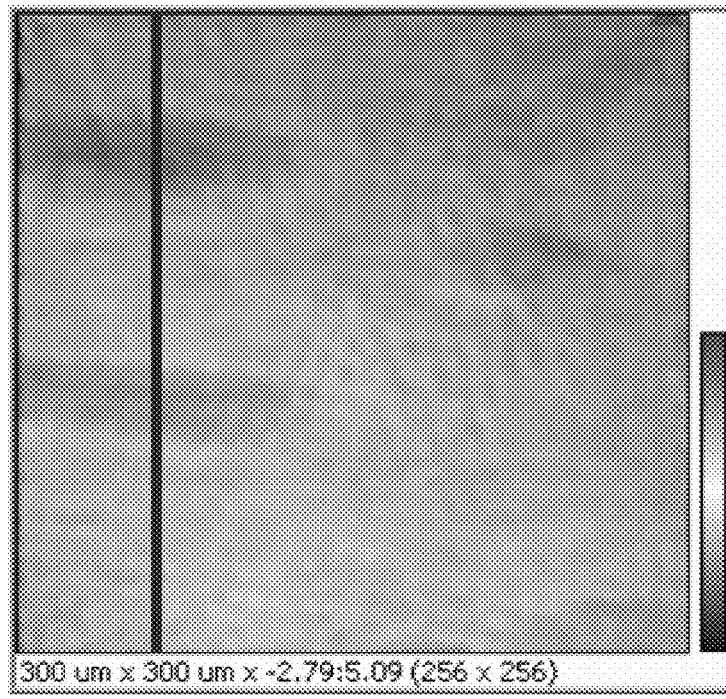
FIG. 22 is a quantitative phase contrast image from the TIRHM. Water droplets were placed on the face of the objective prism. Field of view is 300 μm horizontal×300 μm vertical. The 28:225 aspect ratio is due to the incline of the object plane. The grey scale is measured in radians.
Figure 23:
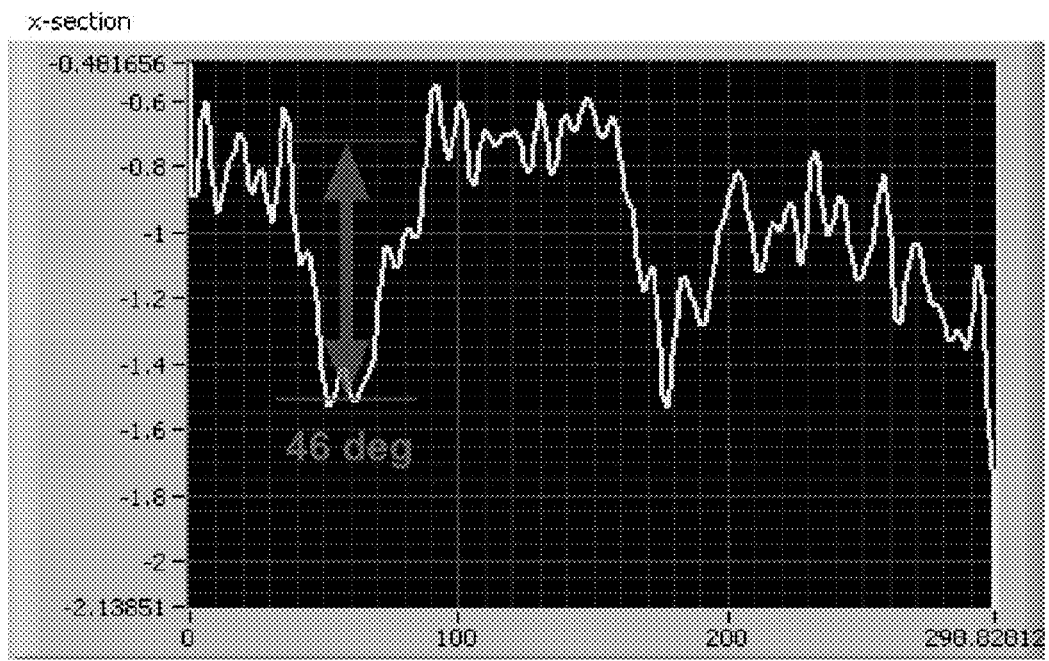
FIG. 23 is a vertical phase cross-section of the phase contrast image depicted in FIG. 22.
Figure 24:
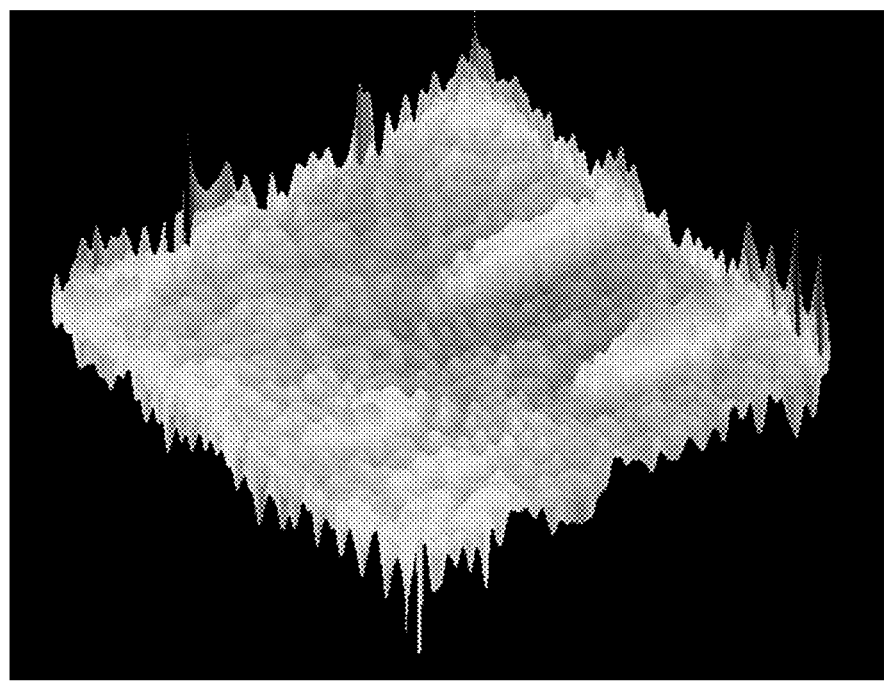
FIG. 24 is a reconstruction of the image data of the water droplets.

In FIGS. 20 through 24, a few water droplets were placed onto the TIRHM prism surface, while to remaining area was exposed to air. The hologram image, seen in FIG. 20, shows the outline of three water drops on the prism surface. The angle of incidence was large enough for TIR over the entire area that the amplitude image, seen in FIG. 21, had approximately uniform brightness over the entire frame. However, the phase shifts upon reflection differ between glass-water and glass-air interfaces, due to differing optical indices of the glass prism (1.50) and the water (1.33), which can be inferred from FIG. 3. The phase shift image, seen in FIG. 22, clearly outlines the glass-water interface with a few nanometers resolution. The cross section of phase image was then graphed, seen in FIG. 23. The data from the hologram was then combined with the amplitude and phase shift data to generate a three dimensional image of the results, seen in FIG. 24.

Figure 25:
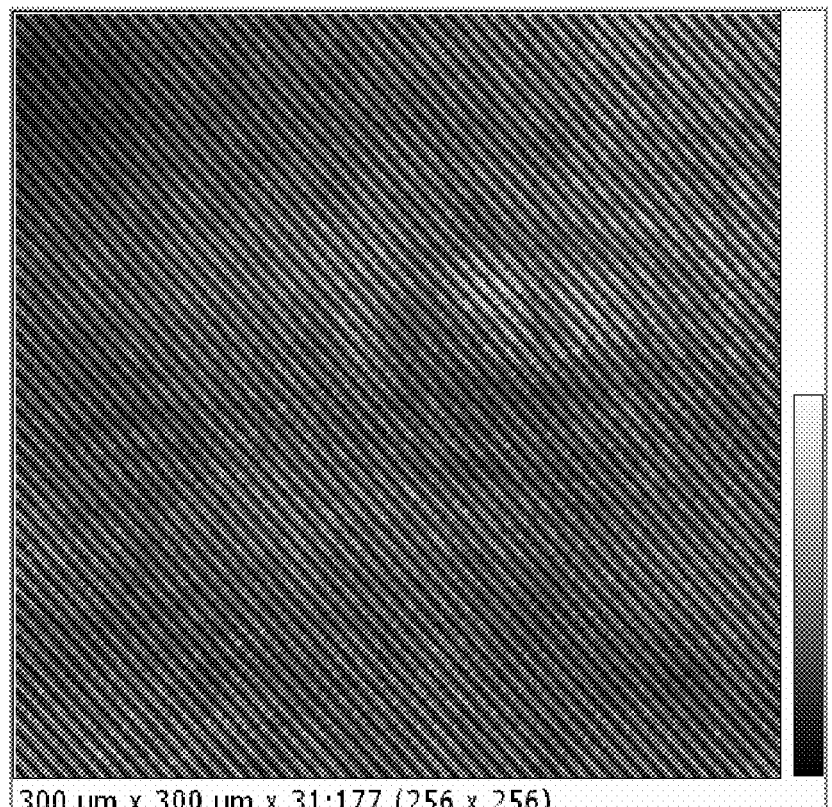
FIG. 25 is a hologram image taken from the TIRHM. Sand grains were placed on the face of the objective prism. Field of view is 300 μm horizontal×300 μm vertical. The 31:177 aspect ratio is due to the incline of the object plane. The grey scale is measured in radians.
Figure 26:
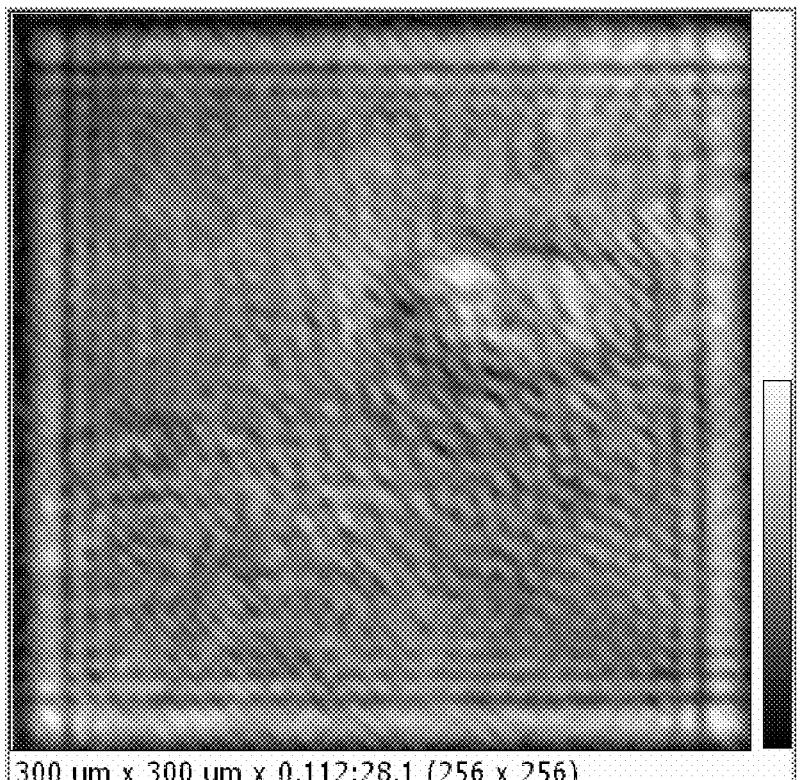
FIG. 26 is an image of the amplitude from the TIRHM. Sand grains were placed on the face of the objective prism. Field of view is 300 μm horizontal×300 μm vertical. The 31:177 aspect ratio is due to the incline of the object plane. The grey scale is measured in radians.
Figure 27:
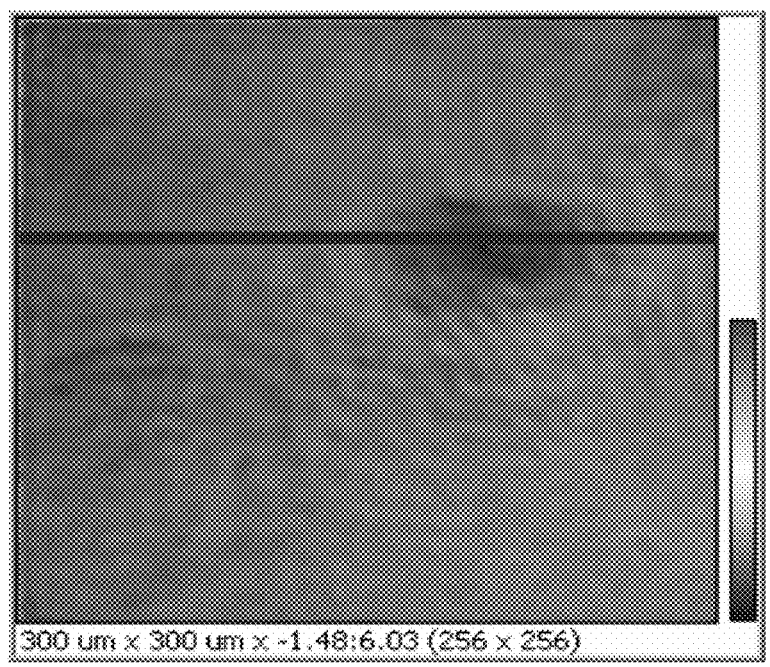
FIG. 27 is a quantitative phase contrast image from the TIRHM. Sand grains were placed on the face of the objective prism. Field of view is 300 μm horizontal×300 μm vertical. The 31:177 aspect ratio is due to the incline of the object plane. The grey scale is measured in radians.
Figure 28:
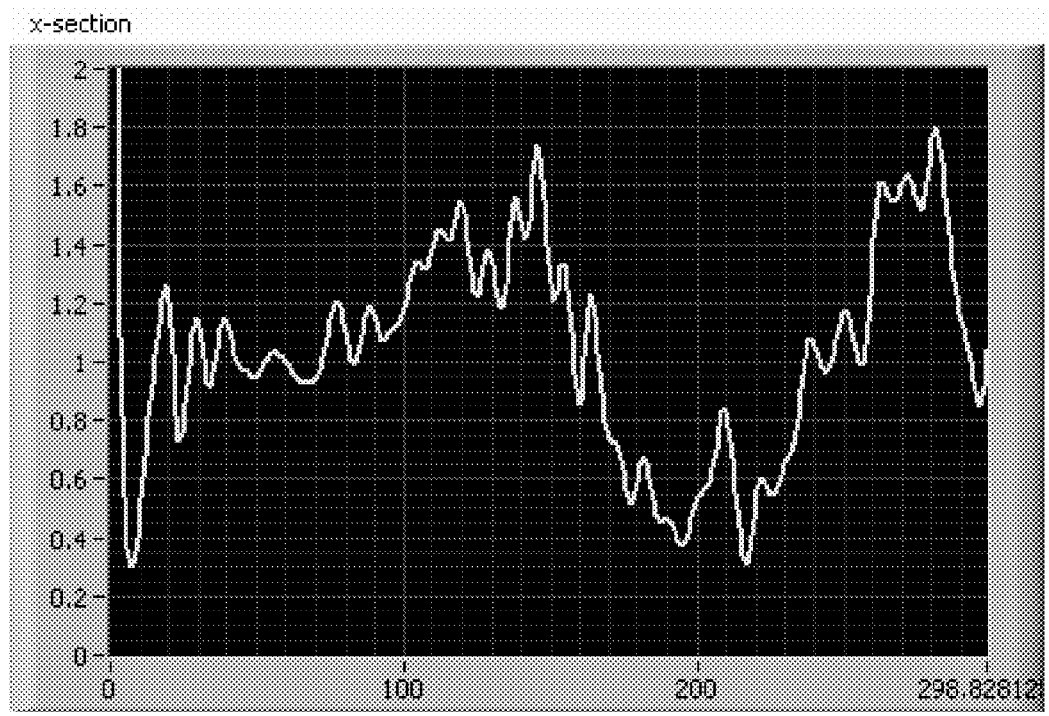
FIG. 28 is a vertical phase cross-section of the phase contrast image depicted in FIG. 27.
Figure 29:
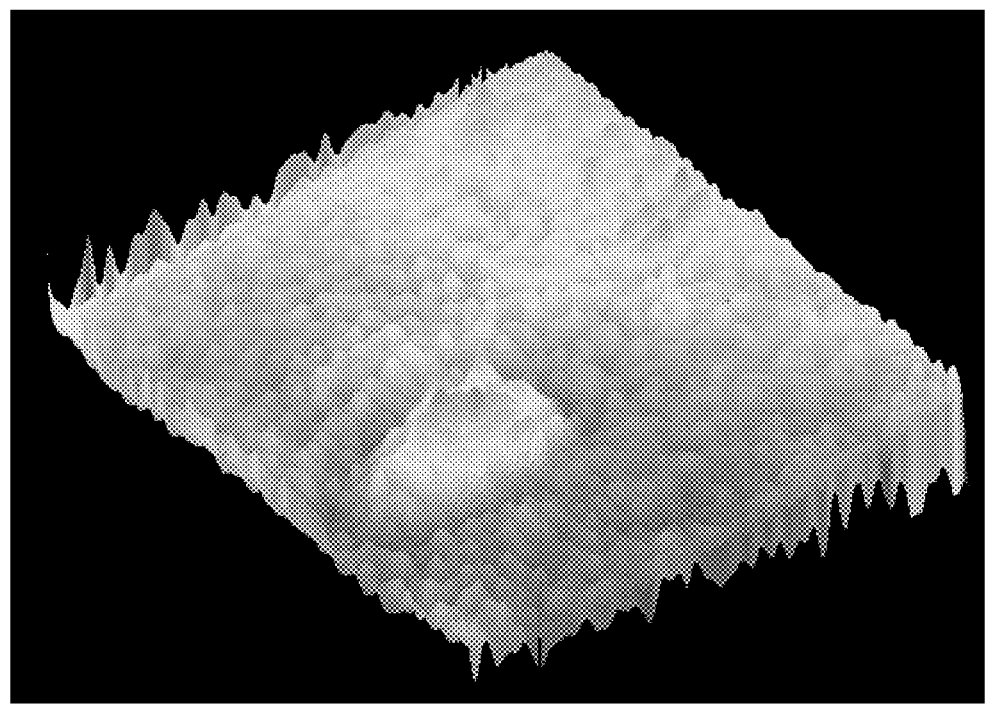
FIG. 29 is a reconstruction of the image data of the water droplets.
Figure 30:
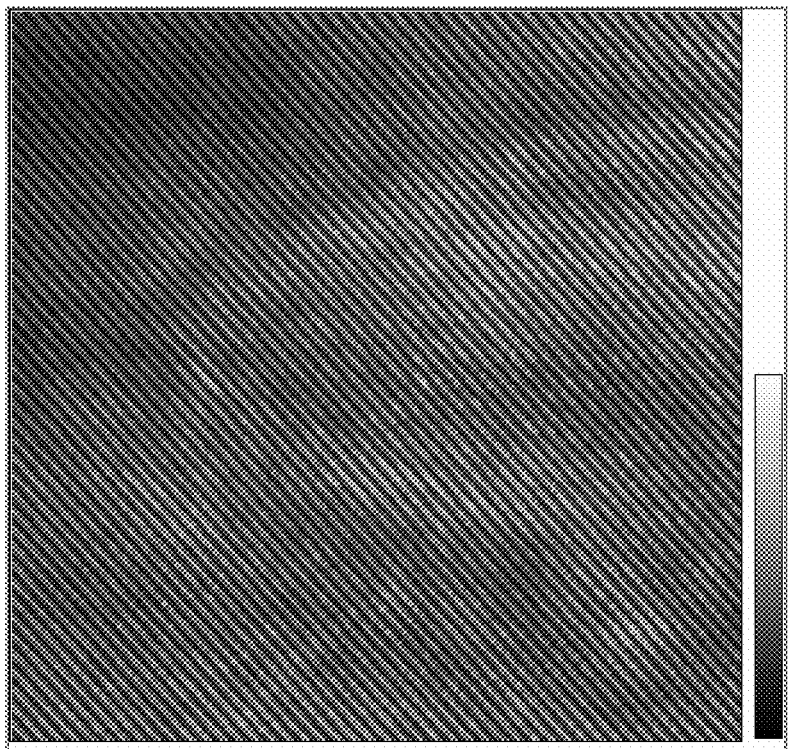
FIG. 30 is a hologram image taken from the TIRHM. Teflon film was placed on the face of the objective prism and pressed down with a grain of sand. Field of view is 300 μm horizontal×300 μm vertical. The 29:160 aspect ratio is due to the incline of the object plane. The grey scale is measured in radians.
Figure 31:
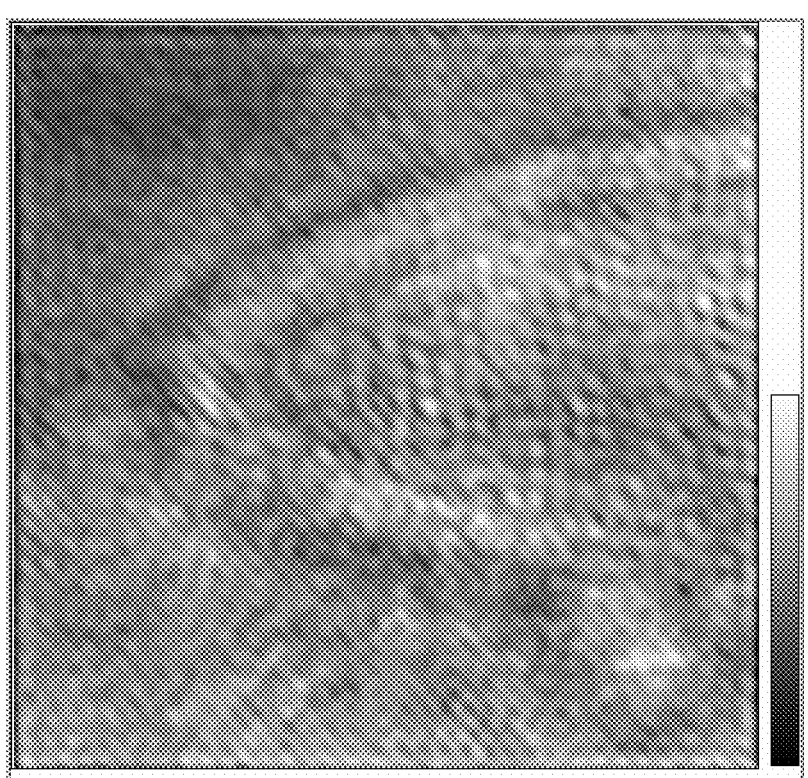
FIG. 31 is an image of the amplitude from the TIRHM. Teflon film was placed on the face of the objective prism and pressed down with a grain of sand. Field of view is 300 μm horizontal×300 μm vertical. The 31:177 aspect ratio is due to the incline of the object plane. The grey scale is measured in radians.
Figure 32:
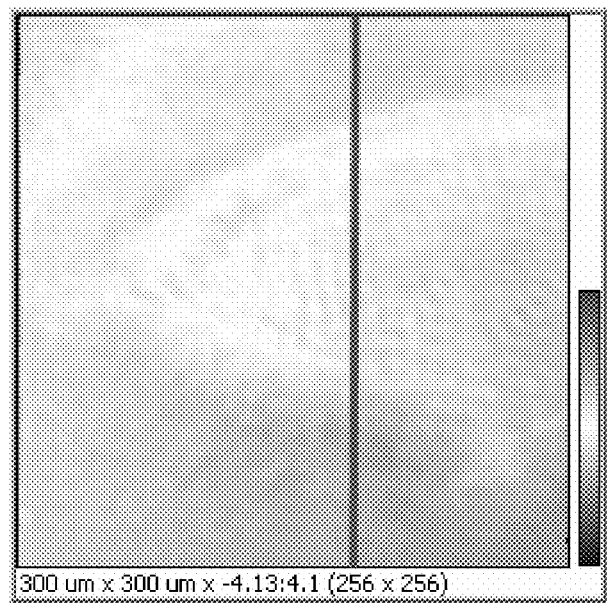
FIG. 32 is a quantitative phase contrast image from the TIRHM. Teflon film was placed onto the face of the prism and pressed down with a grain of sand. Field of view is 300 μm horizontal×300 μm vertical. The 0.31:23.6 aspect ratio is due to the incline of the object plane. The grey scale is measured in radians.

In FIGS. 25 through 29, a few grains of sand were placed onto the TIRHM prism surface, while to remaining area was exposed to air. The hologram image is seen in FIG. 25 showing the outline of two grains of sand. The amplitude image is seen in FIG. 26. The phase shifts upon reflection differ between glass-silico and glass-air interfaces, due to differing optical indices of the glass prism (1.50) and the sand (1.38). The phase shift image is seen in FIG. 27, along with the cross section graph, seen in FIG. 28. The data from the hologram was then combined with the amplitude and phase shift data to generate a three dimensional image of the results, seen in FIG. 29.

Figure 33:
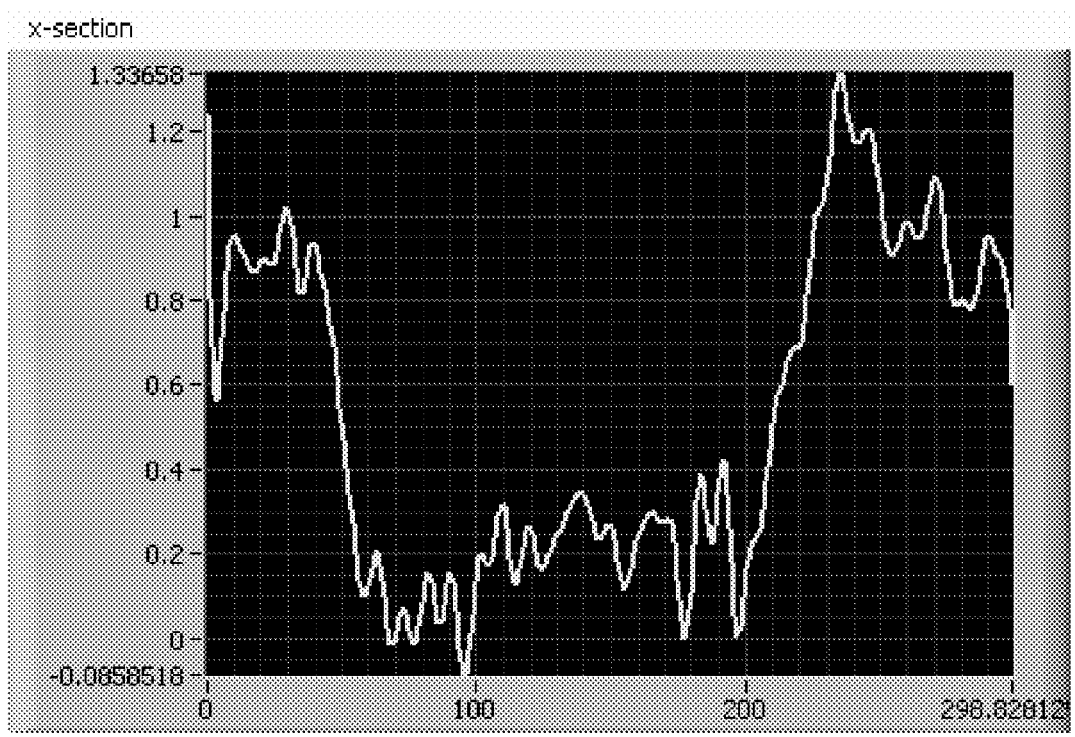
FIG. 33 is a vertical phase cross-section of the phase contrast image depicted in FIG. 32.
Figure 34:
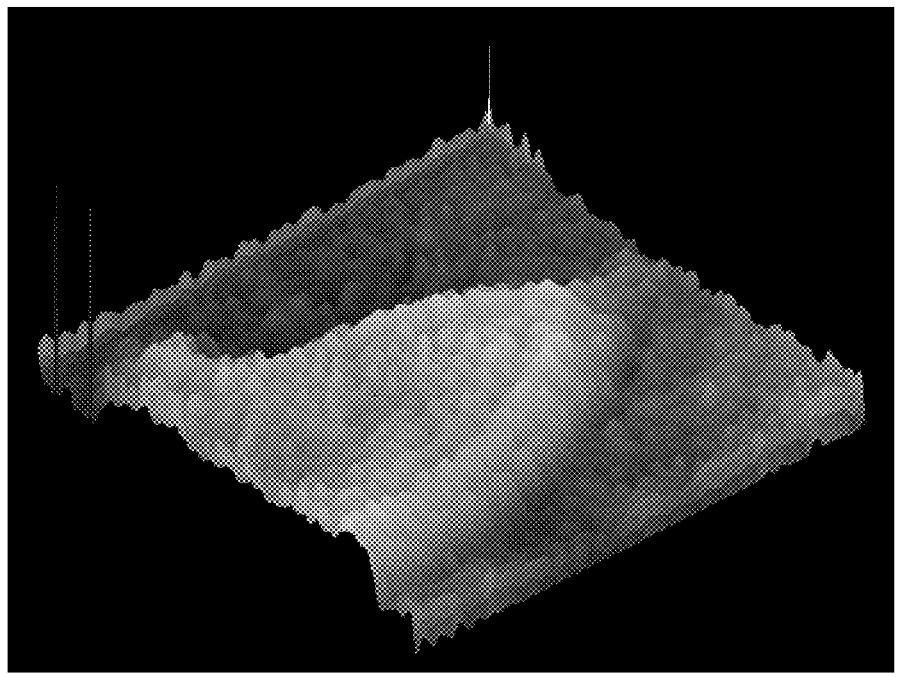
FIG. 34 is a reconstruction of the image data of the water droplets.
Figure 35:
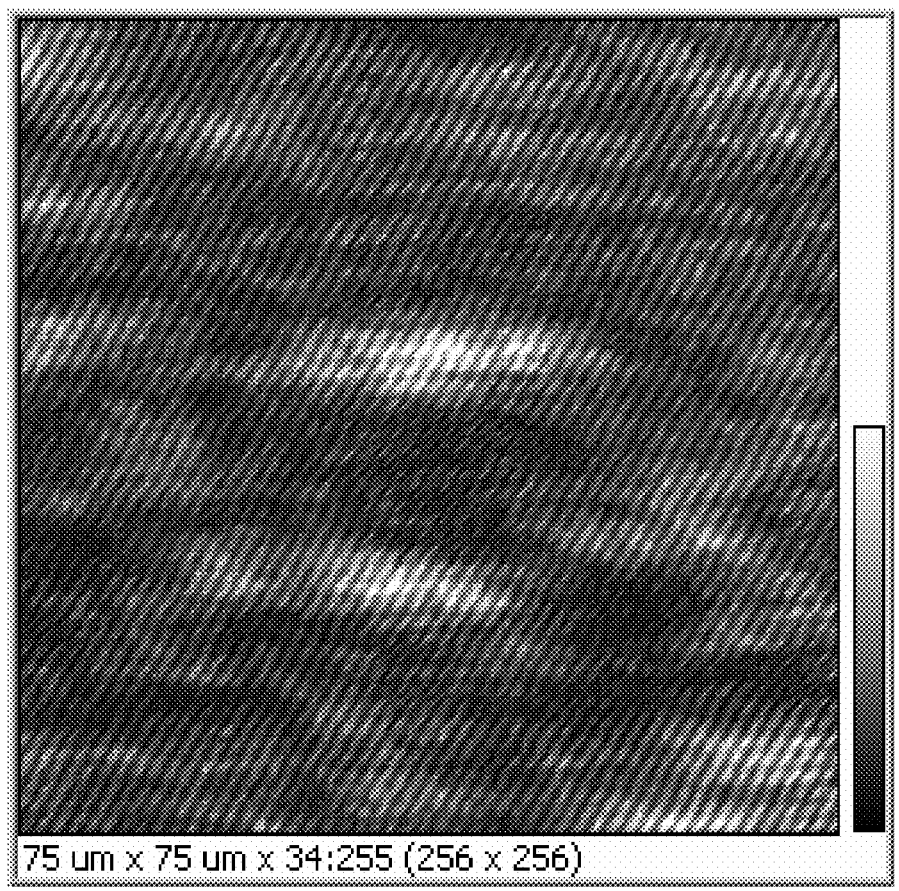
FIG. 35 is a hologram image taken from the TIRHM. SKOV-3 cells were cultured and the Petri dish placed on the face of the objective prism. Field of view is 75 μm horizontal× 75 μm vertical. The 34:255 aspect ratio is due to the incline of the object plane. The grey scale is measured in radians.
Figure 36:
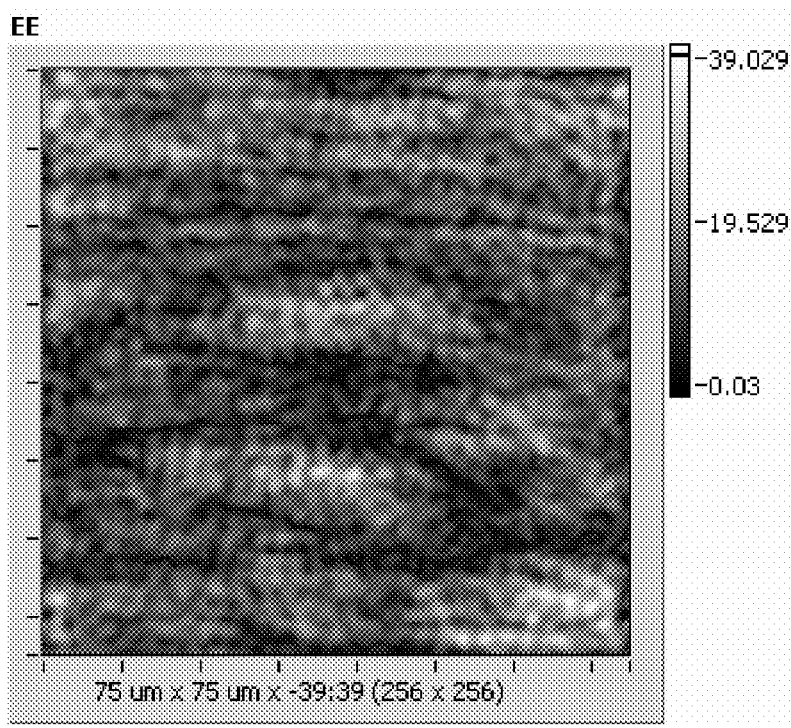
FIG. 36 is an image of the amplitude from the TIRHM. SKOV-3 cells were cultured and the Petri dish placed on the face of the objective prism. Field of view is 75 μm horizontal× 75 μm vertical. The −39:39 aspect ratio is due to the incline of the object plane. The grey scale is measured in radians.
Figure 37:
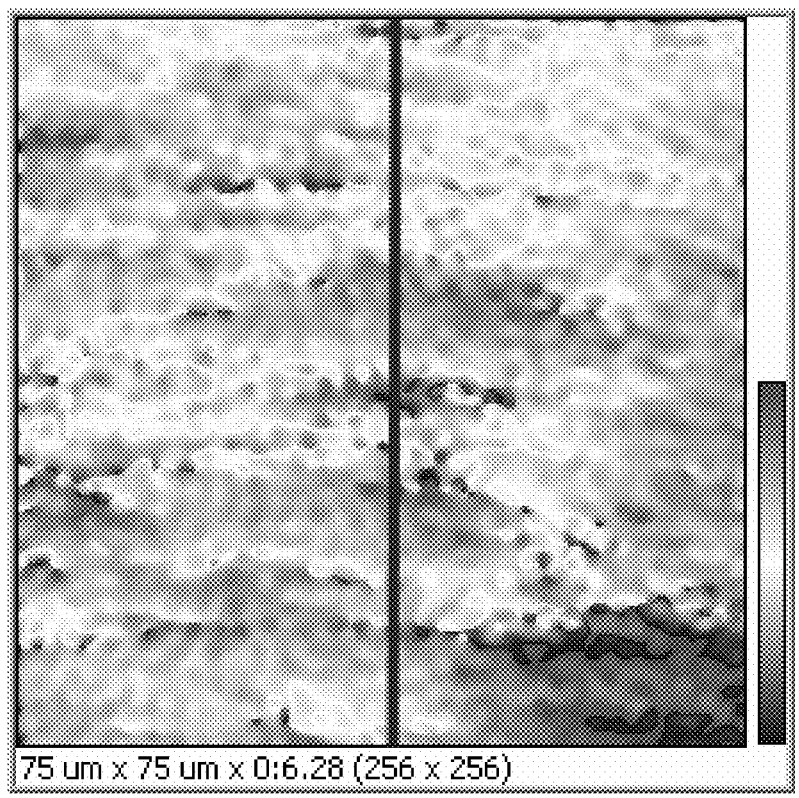
FIG. 37 is a quantitative phase contrast image from the TIRHM. SKOV-3 cells were cultured and the Petri dish placed on the face of the objective prism. Field of view is 75 μm horizontal×75 μm vertical. The 0.31:23.6 aspect ratio is due to the incline of the object plane. The grey scale is measured in radians.
Figure 38:
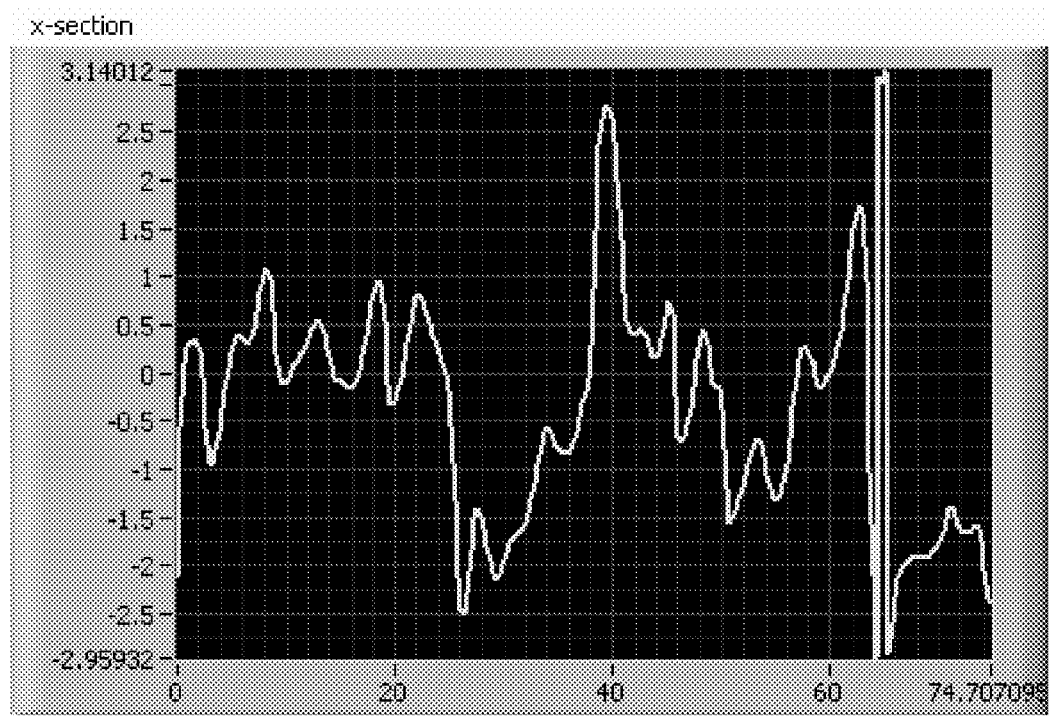
FIG. 38 is a vertical phase cross-section of the phase contrast image depicted in FIG. 37.
Figure 39:
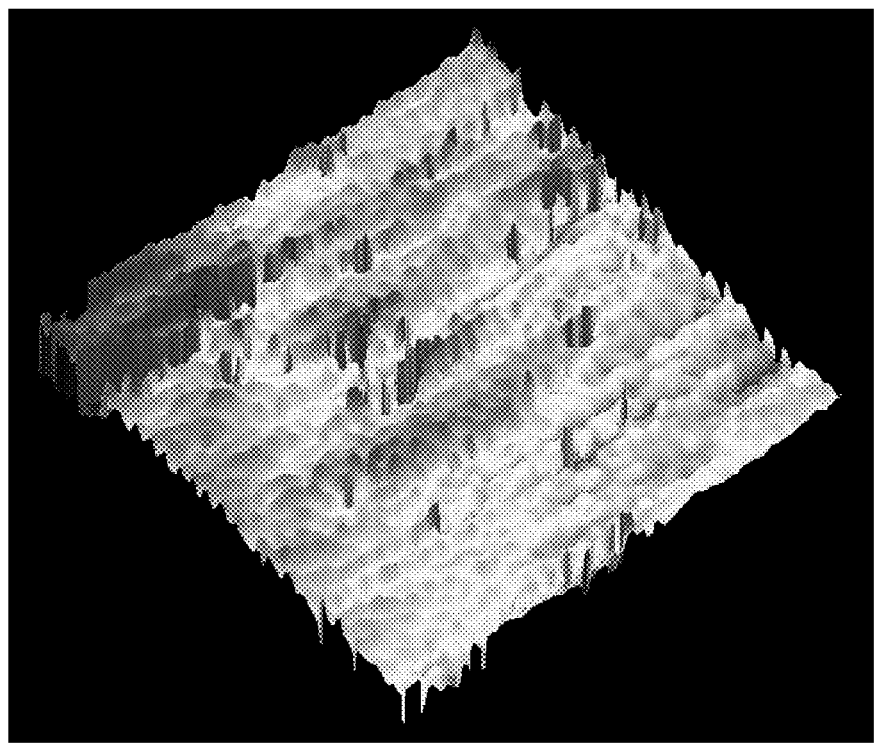
FIG. 39 is a reconstruction of the image data of the water droplets.

FIGS. 30 through 34 show a spherical lens (f=300 mm) coated in one-mil thick Teflon film (index 1.38) pressed by a grain of sand. The slide (Teflon)-prism (glass) contact point is visible in TIRHM hologram image, seen in FIG. 30, and amplitude image, seen in FIG. 31. The range of fITR inferred from the phase profile is consistent with the radius of curvature on the lens But the remaining area is not close enough for fTIR, as depicted in the phase image, seen in FIG. 32. The phase data was graphed, as seen in FIG. 33, and imaged in three dimensions, seen in FIG. 34.

In FIGS. 35 through 39, SKOV-3 cells were cultured in a Petri dish in MEDIA. The cells, in the dish, were placed on the TIRHM, and a hologram image obtained, seen in FIG. 35. An amplitude image, seen in FIG. 36, and phase shift image (indices of 1.33 for the media and 1.38 for the cells), seen in FIG. 37, were collected as before. A cross section of phase image was then graphed, seen in FIG. 38. The data from the hologram was combined with the amplitude and phase shift data to generate a three dimensional image of the SKOV-3 cells, seen in FIG. 39.

Example 6

The software for TIRHM was developed using LabVIEW, MatLab, and C++ platforms to interface with the camera and perform basic camera functions (calibration, image capture, and image pre-processing), calculate the holographic images using numerical diffraction algorithms (including zero padding for frame resizing and interpolation for Fresnel method, apodization to reduce edge fringes, and spectral filtering for the angular spectrum method), and store and document the images.

The LabVIEW was selected due to its friendly user interface and programming of the general flow and control of the experimental apparatus and processes. Additionally, it can interface with MatLab to carry out core computations and graphic presentations. The software system was compiled and implemented on a FPGA (field programmable gate array) to achieve dramatic improvements in the holographic image acquisition rates and give us the flexibility to implement many other image processing functions without overloading the system.

Development of an effective and efficient algorithm for holographic image reconstruction over an inclined plane was an integral component. Existing algorithms have limitations in applicable ranges of parameters, speed of calculation, and precision of the calculation results. The developed algorithms allow calculation of diffraction fields at an arbitrary distance (including zero distance), inclined at an arbitrary angle (up to 90 degrees), without a Fresnel parabolic wavefront approximation, and with a fairly high speed of calculation.

The diffraction calculation with a rotation around the y-axis consists of a double integral on $(k_x, k_y)$ space. The integral over is a Fourier transform and can be handled with FFT, while the integral over k is not a Fourier transform and is therefore handled with an explicit loop over the variable's range. If the rotation of the incline is around both x- and y-axes, then one can first rotate the coordinates so that the incline becomes a rotation along just one axis. The calculation would start with a rotation of the input image array around the z-axis so that the incline orientation is along either the new x'- or y'-axis, and followed by a numerical diffraction to the inclined destination plane. The resultant diffraction image array is then rotated back to the original input image's orientation. When rotating, and un-rotating, a rectangular image array in its plane, it is necessary to resize and reshape the array, so that the corners of the image do not get out of the rectangular boundary.

Figure 40:
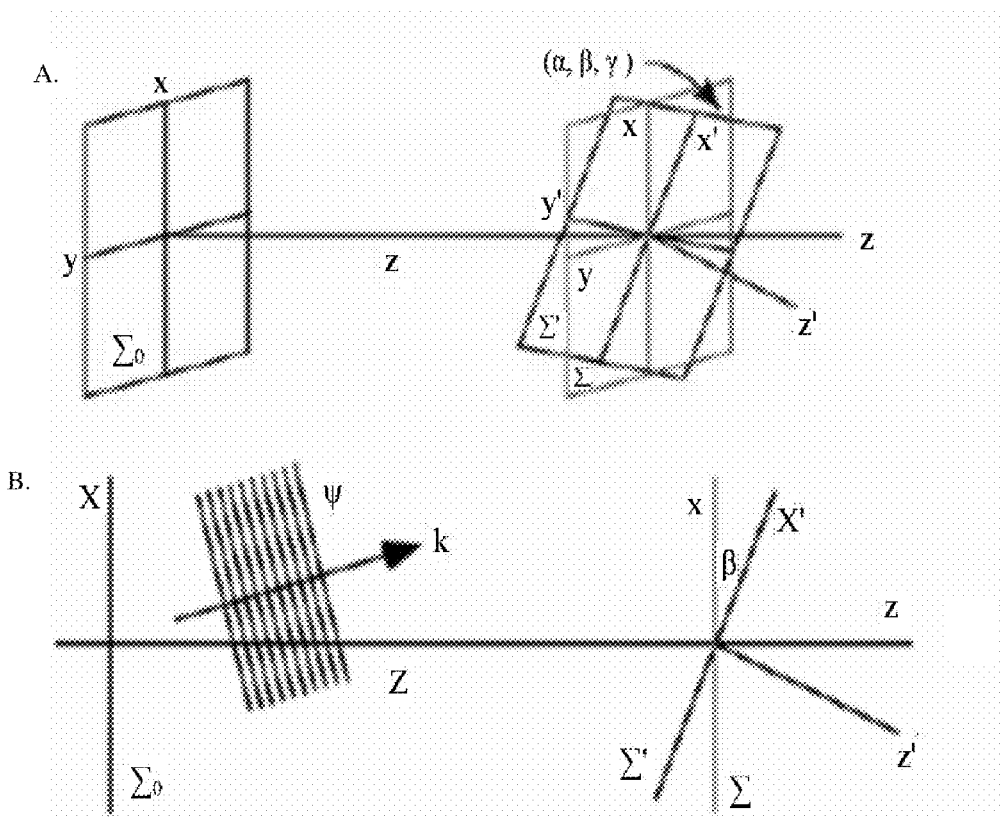
FIG. 40 depicts the geometry over an inclined plane. Algorithms were based on (a) general coordinate system with an input plane $\Sigma_0$ and output planes $\Sigma$ (unrotated) and $\Sigma'$ (rotated) and (b) a coordinate system for rotation around the y-axis only; where $\alpha=\gamma=0$, $\beta\neq0$.

General algorithms were based on angular spectrum analysis. Briefly, referring to FIG. 40, the field at input plane $\Sigma_0$ is $E_{\Sigma 0}$ (x,y), seen in FIG. 40(a). Its Fourier transform gives the angular spectrum, or the plane wave decomposition of the input field, just as in non-inclined case considered above: $F\{E_{\Sigma 0}(x,y)\}=F(k_x,k_y)$. Each of the plane wave components $\psi=\exp i[k_x x+k_y y+k_z z]$ with $k_z=\sqrt{k_2-k_x^2-k_y^2}$ propagates to the output plane $\Sigma'$, which is inclined. The calculations were restricted to rotation by an angle $\beta$ around the y-axis only, seen in FIG. 40(b), which in fact corresponds to $\theta_1$ in FIG. 3. The plane wave on $\Sigma'$ is $\psi=\exp i[k'_x x'+k'_y y'] \exp(ik_z Z)$, where $(k'_x, k'_y)=(k_x \cos\beta-k_z \sin\beta, k_y)$. Alternatively, one can also write $\psi_{\Sigma'}=\exp i[k_x x_{\Sigma'}+k_y y_{\Sigma'}+k_z z_{\Sigma'}]$ with $(x_{\Sigma'}, y_{\Sigma'}, z_{\Sigma'})=(\cos\beta x', y', -\sin\beta x'+Z)$. Recombination of the plane wave components at the output plane then yields the resultant diffraction field $E_{\Sigma'}(x',y')=\int dk_y \exp(ik_y') \int dk_x F(k_x, k_y) \exp i[k_x x_{\Sigma'}+k_z z_{\Sigma'}]$. That is, while the integration over $k_y$ is an inverse Fourier transform and therefore fast Fourier transform (FFT) is available, the integration over $k_x$ is in general not a Fourier transform and therefore is handled by direct summation of the array. The algorithm provides exact (non-approximated) results with a reasonable compromise in computation speed.

Figure 41:
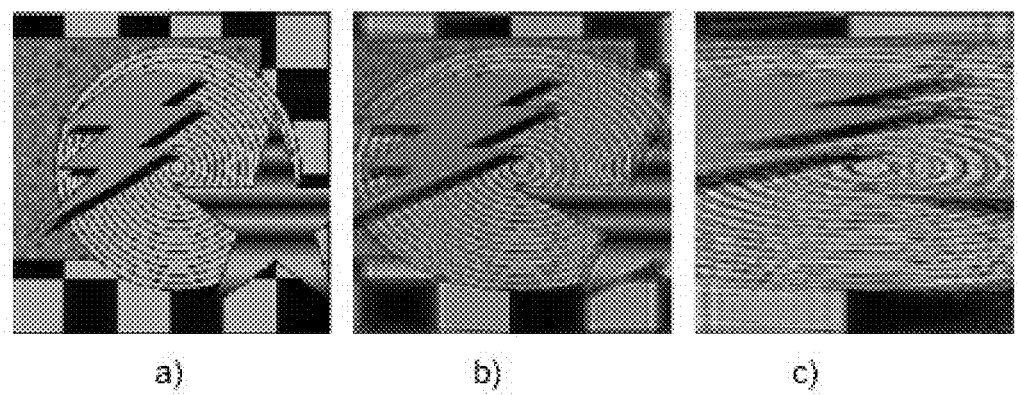
FIGS. 41(a) through (c) depict numerical diffraction of a simulated object. The object was altered to an incline of (a) 0 degrees, (b) 45 degrees, or (c) 73 degrees.
Figure 42:
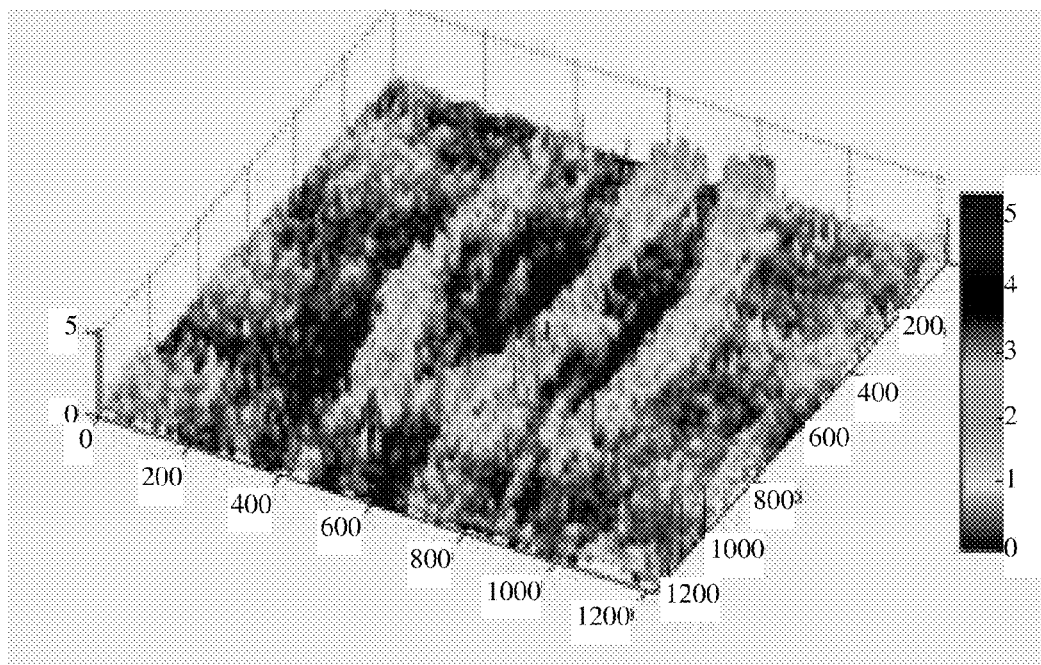
FIG. 42 is an image of a number "6" taken with holographic phase imaging. The image was reconstructed of a real object with a 73 degree incline on a 157×157 area resolution target. The height of the chrome film "6" was about 50 nm.

Because the image is captured at an angle, numerical diffraction is required to compensate for image aberrations. An image processing algorithm was developed using $E_{\Sigma'}(x',y')=\int\int dk_x dk_y F(k_x, k_y)\psi_{\Sigma'}=\int\int dk_x' dk_y' \eta F)\exp i[k_x'x'+k_y'y']\exp i[k_z Z]=F-1\{\eta F(k_x, k_y)\exp[k_z Z]\}$, where $k_z'(k_x', k_y')=\sqrt{k^2-k_x'^2 k_y'^2}$, $k_x(k_x', k_y')=k_x'\cos\beta-k_z'\sin\beta$, $k_z(k_x', k_y')=k_x'\sin\beta-k_z'\cos\beta$, and $\eta(k_x', k_y')=\cos\beta+[k_x'/k_z']\sin\beta$. FIGS. 41(a) through 41(c) show numerical diffraction over an inclined plane for a simulated object of 300×300 µm2 (178×178 pixels). The incline is 0, 45, and 73 degrees, respectively for a), b), and c) at a distance of z=0 using a wavelength of 500 nm. One can notice the anamorphic stretching of the image due to rotation, as well as defocusing at the x-edges, while the x=0 (central vertical) line remains in focus. A proof-of-principle experiment was performed by placing a drop of glycerin (n=1.47) on the prism and pressing a resolution target (chrome patterns on glass) on top of it. See FIG. 42. Holographic phase image of a numeral '6' in a field of 157×157 m2 (400×400 pixels) is reconstructed at an angle of 73 degrees, where the calculated phase profile is rendered in a 3D perspective to represent about 50 nm overall height variation of the chrome film.

The spatial frequency k of interference fringes of a plane wave impinging on a plane changes as $k_x \cos\beta$ when the plane rotates by $\beta$. This is a nonlinear mapping and the domain $(k_x, k_y)$ must be integrated with a non-uniform density of sample points. This is a cause of some spurious fringing of the diffracted image. An alternative approach may be to first calculate a whole 3D volume of diffracted field using conventional (non-inclined) diffraction algorithm, and slicing the volume with an appropriately inclined plane. The resultant procedure may be a more straightforward and robust, though possibly slower, compared to the above-described algorithm.

Example 7

The imaging system was calibrated, beginning with a holographic imaging experiment on a resolution target that is placed at an angle with respect to the optical axis. The digital holography algorithms were tested for reconstruction on an inclined plane, by carrying out the imaging experiments while varying key parameters such as the incline angle, magnification, pixel resolution, and the relative distances between the object, hologram, and objective lens. The calibration experiments also used cellular specimens on a slide glass to verify that the imaging characteristics are consistent with resolution target measurements.

Next the prism is introduced in the optical path, with a resolution target placed on top of the prism with a drop of immersion oil as an index matching medium. The laser light underwent direct reflection (not TIR) at the resolution target, to test the imaging system with the prism in place, without the complications of TIR. In particular, the optimal configurations were optimized for the prism size, the objective lens position and magnification, and the hologram plane (H) position.

To demonstrate and calibrate TIRHM, calibrated spherical beads were placed in contact on the prism's face. For example, the spherical surface of a bead 2 mm in diameter rises by about 200 nm from its base at a radial distance of 80 m from the point of contact. This provided a quantifiable surface profile with continuous variation of the prism-object gap distance. The TIRHM phase image from this object will display a meniscus-like surface about 80 µm in diameter and about 200 nm high at the edge.

A 0.65 NA objective obtained 0.5 µm diffraction-limited resolution using "ordinary" (nonTIR) digital holographic microscopy experiments. The presence of the prism between the object and the lens constrains the working distance, necessitating a small prism and appropriately sized sample slides.

Contrary to common preconception, however, it turns out that a phase image in digital holography tends to be much less susceptible than an intensity image is to imperfections in the optical chain such as dust, aberrations, mechanical perturbations, etc. This is because that while the laser intensity profile and all its distortions, as it goes through the entire optical chain, can directly affect the intensity profile of the holographic images, the phase image is affected only by the difference between the reference and object arms of the interferometer. Careful placement and maintenance of optical components can significantly reduce potential noise sources, and for microscopic imaging, the quality of only a small area of the optical surfaces needs to be highly maintained.

Images quality depends on the ability of the imaging system to isolate noise from the signal. With cellular adhesion, the interface layer, but not spurious cell body images, are desirable. TIRFM is effective in isolating or optically sectioning the interface layer, but what it images is the fluorophores in the layer, not the layer itself. The IRM images the interface layer itself but such image is usually crowded with reflection images from the cell body. These factors make it difficult to obtain quantitative phase images of the interface layers alone. The TIRHM system has optical sectioning capability as good as TIRFM and quantitative phase imaging capability far better than IRM.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of obtaining, by holographic microscopy, a three dimensional image of a specimen, the method comprising:
    illuminating a prism with radiation at a wavelength to form an internal reflected image beam;
    placing an object on the prism to cause the reflected image beam to become a frustrated total internal reflection image beam;
    providing a reference beam comprising the wavelength;
    recording an interference pattern between the reference beam and the image beam;
    computing a holographic image from the interference pattern for the wavelength;
    correcting microscope image distortion; and
    reassembling the images into a three-dimensional model.

2. The method of claim 1, wherein the interference pattern provides simultaneous amplitude and phase contrast information.

3. The method of claim 1, wherein the interference pattern results from a phase shift from frustrated total internal reflection.

4. The method of claim 1, wherein the holographic image is computed as an array of complex numbers that directly yield the phase profile of light after frustrated total internal reflection, representing the optical thickness variation of the cell-prism gap.

5. The method of claim 1, wherein the holographic image is computed from numerical reconstruction algorithm of an inclined surface of the object/prism.

6. The digital holographic microscope of claim 5, wherein the numerical reconstruction algorithm is capable of imaging the optical field at an arbitrary distance, orientation, and over a large inclination angle with respect to the optical axis.

7. The digital holographic microscope of claim 5, wherein the numerical reconstruction algorithm is based on an angular spectrum method.

* * * * *